US010875193B2

(12) United States Patent
Nagata et al.

(10) Patent No.: US 10,875,193 B2
(45) Date of Patent: Dec. 29, 2020

(54) ROBOT HAND APPARATUS, ROBOT HAND SYSTEM, AND HOLDING METHOD

(71) Applicant: Panasonic Intellectual Property Management Co., Ltd., Osaka (JP)

(72) Inventors: Takayuki Nagata, Osaka (JP); Yasunao Okazaki, Shiga (JP); Katsuhiko Asai, Nara (JP); Kazuo Inoue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 280 days.

(21) Appl. No.: 16/039,293

(22) Filed: Jul. 18, 2018

(65) Prior Publication Data

US 2019/0030728 A1 Jan. 31, 2019

(30) Foreign Application Priority Data

Jul. 28, 2017 (JP) .................... 2017-146690

(51) Int. Cl.
*B25J 15/06* (2006.01)
*B25J 19/02* (2006.01)
(Continued)

(52) U.S. Cl.
CPC .......... *B25J 15/065* (2013.01); *B25J 9/1697* (2013.01); *B25J 15/0061* (2013.01);
(Continued)

(58) Field of Classification Search
CPC .. B25J 15/065; B25J 15/0061; B25J 15/0616; B25J 15/0658; B25J 15/0683; B25J 15/12; B25J 9/1697; B25J 19/023
See application file for complete search history.

(56) References Cited

U.S. PATENT DOCUMENTS 5,020,842 A * 6/1991 Miwa ................ A01H 4/001
294/183
9,452,537 B2 * 9/2016 Nammoto .............. B25J 15/065
(Continued)

FOREIGN PATENT DOCUMENTS

DE  10 2015 206 191   10/2016
JP       49-135065      12/1974
(Continued)

OTHER PUBLICATIONS

Yamaguchi, Kengo; Hirata, Yasuhisa; Kosuge, Kazuhiro. "Development of Robot Hand with Suction Mechanism for Robust and Dexterous Grasping". 2013 IEEE/RSJ International Conference on Intelligent Robots and Systems (IROS) Nov. 3-7, 2013. Tokyo, Japan (Year: 2013).*
(Continued)

*Primary Examiner* — Nicholas Kiswanto
(74) *Attorney, Agent, or Firm* — Wenderoth, Lind & Ponack, L.L.P.

(57) ABSTRACT

A robot hand apparatus includes a first holder having a bendable first sucking surface that sucks an object using negative pressure; and a second holder having a bendable second sucking surface that sucks the object using negative pressure. The first holder and the second holder are arranged such that the first sucking surface opposes the second sucking surface. When the first holder and the second holder hold the object, in a state in which the first sucking surface is bent at a first position and the second sucking surface is bent at a second position, the object is sucked to a region of the first sucking surface between the first position and a distal end of the first holder, and the object is sucked to a region of the second sucking surface between the second position and a distal end of the second holder.

16 Claims, 18 Drawing Sheets

(51) Int. Cl.
  *B25J 15/00* (2006.01)
  *B25J 15/12* (2006.01)
  *B25J 9/16* (2006.01)
(52) U.S. Cl.
  CPC ....... *B25J 15/0616* (2013.01); *B25J 15/0658* (2013.01); *B25J 15/0683* (2013.01); *B25J 15/12* (2013.01); *B25J 19/023* (2013.01)

(56) References Cited

U.S. PATENT DOCUMENTS

| | | |
|---|---|---|
| 9,457,477 B1 | 10/2016 | Rublee et al. |
| 2016/0075036 A1 | 3/2016 | Lessing et al. |
| 2016/0114482 A1 | 4/2016 | Lessing et al. |
| 2017/0326735 A1* | 11/2017 | Yoon .................... B25J 15/0052 |
| 2019/0030727 A1* | 1/2019 | Nagata .................. B25J 9/1697 |

FOREIGN PATENT DOCUMENTS

| | | |
|---|---|---|
| JP | 2001-267271 | 9/2001 |
| JP | 2013-240870 | 12/2013 |

OTHER PUBLICATIONS

Extended European Search Report dated Feb. 1, 2019 in corresponding European Patent Application No. 18185375.5.

* cited by examiner

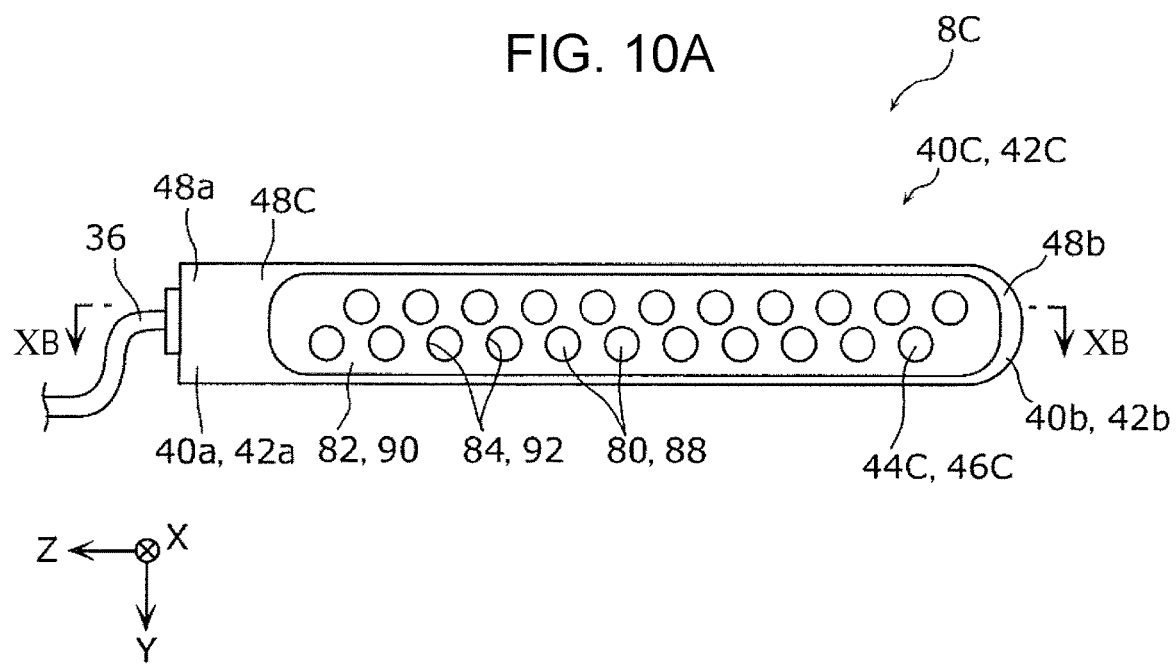
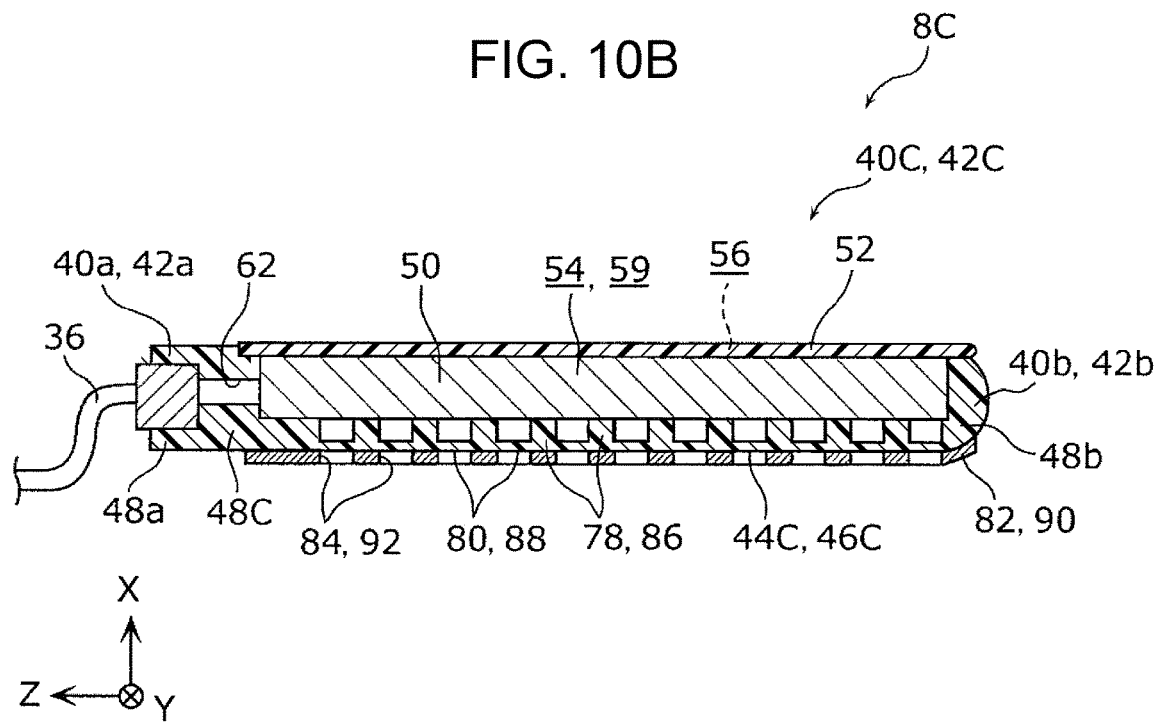

ROBOT HAND APPARATUS, ROBOT HAND SYSTEM, AND HOLDING METHOD

BACKGROUND

1. Technical Field

The present disclosure relates to a robot hand apparatus, a robot hand system, and a holding method.

2. Description of the Related Art

A robot hand apparatus of a type that sucks an object using negative pressure is known as one of robot hand apparatuses that hold objects (see, for example, Japanese Unexamined Patent Application Publication No. 2001-267271 and No. 2013-240870). The robot hand apparatus of this type includes a suction hand having a sucking surface formed with sucking holes. An object can be sucked to the sucking surface of the suction hand using negative pressure by sucking air through the sucking holes in a state in which the sucking surface of the suction hand touches a surface that can be sucked of the object (hereinafter, referred to as "sucked surface").

SUMMARY

In some cases there is a need to pick up a specific product as an object with a robot hand apparatus from among products which are densely arranged in, for example, a warehouse of a store, without picking up a product other than the specific product. If the sucked surface of the object is smaller than the sucking surface of the suction hand, the target object and another product adjacent to the object are sucked together to the sucking surface of the suction hand. Thus, the target object and a product other than the specific product may be possibly picked up.

One non-limiting and exemplary embodiment provides a robot hand apparatus, a robot hand system, and a method of holding an object each capable of correctly picking up a target object.

In one general aspect, the techniques disclosed here feature a robot hand apparatus including a supporter; a first holder with a proximal end thereof supported by the supporter, the first holder having a first sucking surface that is bendable at any position and that sucks an object using negative pressure; and a second holder with a proximal end thereof supported by the supporter, the second holder having a second sucking surface that is bendable at any position and that sucks the object using negative pressure, in which the first holder and the second holder are arranged such that the first sucking surface opposes the second sucking surface, and in which, when the first holder and the second holder hold the object, in a state in which the first sucking surface is bent at a first position and the second sucking surface is bent at a second position, the object is sucked to a region of the first sucking surface between the first position and a distal end of the first holder, and the object is sucked to a region of the second sucking surface between the second position and a distal end of the second holder.

It should be noted that general or specific aspects of the present disclosure may be implemented as a system, a method, an integrated circuit, a computer program, a computer-readable storage medium, or any selective combination thereof. The computer-readable storage medium includes, for example, a non-volatile storage medium such as a compact disc-read only memory (CD-ROM).

With the robot hand apparatus or the like according to one aspect of the present disclosure, a target object can be correctly picked up. Additional benefits and advantages according to one aspect of the present disclosure will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10A is a plan view illustrating a first holder (second holder) of a robot hand apparatus according to a fourth embodiment;

FIG. 10B is a cross-sectional view of the first holder (second holder) of the robot hand apparatus according to the fourth embodiment taken along line XB-XB of FIG. 10A;

DETAILED DESCRIPTION

Figure 1:
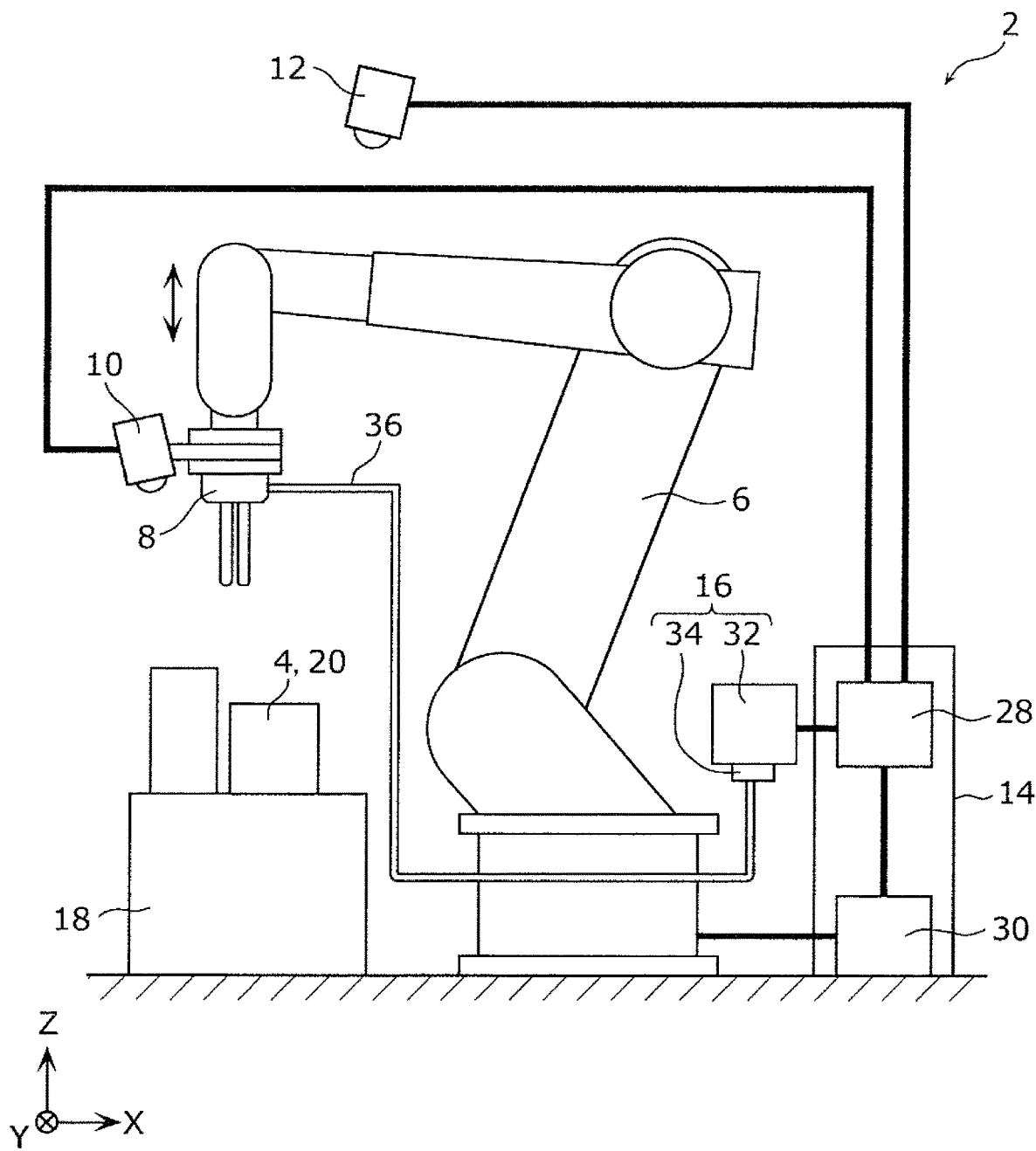
FIG. 1 illustrates a configuration of a robot hand system according to a first embodiment.

According to an aspect of the present disclosure, a robot hand apparatus includes a supporter; a first holder with a proximal end thereof supported by the supporter, the first holder having a first sucking surface that is bendable at any position and that sucks an object using negative pressure; and a second holder with a proximal end thereof supported by the supporter, the second holder having a second sucking surface that is bendable at any position and that sucks the object using negative pressure, in which the first holder and the second holder are arranged such that the first sucking surface opposes the second sucking surface, and in which, when the first holder and the second holder hold the object, in a state in which the first sucking surface is bent at a first position and the second sucking surface is bent at a second position, the object is sucked to a region of the first sucking surface between the first position and a distal end of the first holder, and the object is sucked to a region of the second sucking surface between the second position and a distal end of the second holder.

With the aspect, by adjusting the first position and the second position at which the first sucking surface and the second sucking surface are respectively bent in accordance with the size of the object, the size of the region that sucks the object of each of the first sucking surface and the second sucking surface can be adjusted. Thus, the distal ends of the first holder and the second holder can be prevented from protruding from the ends of the object. For example, a target object can be correctly picked up from among densely arranged products.

For example, the first holder and the second holder may be formed of an elastic material; and the distal ends of the first holder and the second holder may be pressed to the object, and thus the first sucking surface and the second sucking surface may be respectively bent at the first position and the second position.

With the aspect, by using the force of pressing the distal ends of the first holder and the second holder to the object, the first sucking surface and the second sucking surface can be respectively bent at the first position and the second position. Thus, a driving device such as an actuator that bends the first sucking surface and the second sucking surface is not required to be mounted on the robot hand apparatus, and the robot hand apparatus can be downsized. Moreover, since the first holder and the second holder are formed of the elastic material, when the sucking of the object is released, the first holder and the second holder can be restored to the original shape due to the elastic restoring force of the first holder and the second holder.

For example, the first holder may extend long from the proximal end to the distal end of the first holder; the second holder may extend long from the proximal end to the distal end of the second holder; a size of the first holder in a direction perpendicular to a longitudinal direction of the first holder may gradually decrease from the proximal end toward the distal end of the first holder; and a size of the second holder in a direction perpendicular to a longitudinal direction of the second holder may gradually decrease from the proximal end toward the distal end of the second holder.

With the aspect, even when the first position is located near the distal end of the first holder, the first sucking surface can be easily bent at the first position. Moreover, even when the second position is located near the distal end of the second holder, the second sucking surface can be easily bent at the second position.

For example, the robot hand apparatus may further include a first sucker that is provided at the distal end of the first holder and that sucks the object using negative pressure independently from the first sucking surface; and a second sucker that is provided at the distal end of the second holder and that sucks the object using negative pressure independently from the second sucking surface.

With the aspect, when the distal ends of the first holder and the second holder are pressed to the object, the first sucker and the second sucker suck the object using negative pressure, and thus the distal ends of the first holder and the second holder can be prevented from sliding on the object. Thus, the distal ends of the first holder and the second holder can be effectively prevented from protruding from the ends of the object.

For example, the first sucking surface may have a first sucking hole through which air is sucked; the second sucking surface may have a second sucking hole through which air is sucked; and, when the first holder and the second holder hold the object, the first sucking surface may suck air respectively through the first sucking hole and the second sucking hole, and thus suck the object using negative pressure.

With the aspect, the first holder and the second holder can hold the object with the simple configuration.

For example, the first sucking hole may include multiple first sucking holes, and the second sucking hole may include multiple second sucking holes; and, when the first holder and the second holder hold the object, a region of the first sucking surface between the first position and the proximal end of the first holder may come into contact with a region of the second sucking surface between the second position and the proximal end of the second holder.

With the aspect, the first sucking holes provided in the region of the first sucking surface between the first position and the proximal end of the first holder, and the second sucking holes provided in the region of the second sucking surface between the second position and the proximal end of the second holder can be closed. Thus, the object can be efficiently sucked using negative pressure.

For example, a first space may be formed in the first holder; a second space may be formed in the second holder; the first sucking surface may have a first thick portion and a first thin portion that is thinner than the first thick portion; the second sucking surface may have a second thick portion and a second thin portion that is thinner than the second thick portion; and when the first holder and the second holder hold the object, pressures of the first space and the second space may be reduced to be lower than an atmospheric pressure, and thus the first thin portion and the second thin portion may be deformed to respectively protrude toward the first space and the second space and suck the object using negative pressure.

With the aspect, since the first sucking surface and the second sucking surface are closed, even when either of the first sucking surface and the second sucking surface has a region with poor adhesion to the object, high sucking force can be maintained. In general, a sucking hole of a type that sucks air through the sucking hole may be clogged. However, with the aspect, since the sucking portions of the first sucking surface and the second sucking surface are respectively closed with the first thin portions and the second thin portions, the sucking hole can be prevented from being clogged.

For example, the robot hand apparatus may further include a first grip member arranged to cover the first sucking surface, formed of a material having frictional force larger than frictional force of the first thin portion, and having a first opening through which the first thin portion is exposed to outside; and a second grip member arranged to cover the second sucking surface, formed of a material having frictional force larger than frictional force of the second thin portion, and having a second opening through which the second thin portion is exposed to outside, in which, when the pressures of the first space and the second space are increased to be higher than the atmospheric pressure, the first thin portion may be deformed to protrude toward a side opposite to the first space and thus touches the object through the first opening, and the second thin portion may be deformed to protrude toward a side opposite to the second space and thus touches the object through the second opening, and in which, when the pressures of the first space and the second space are set to the atmospheric pressure, a location of the first thin portion may be nearer to the first space than a location of the first opening and thus the first grip member may touch the object, and a location of the second thin portion may be nearer to the second space than a location of the second opening and thus the second grip member may touch the object.

With the aspect, since the first thin portion and the second thin portion touch the object when the pressures of the first space and the second space are increased to be higher than the atmospheric pressure, the frictional force between the object and each of the first holder and the second holder can be reduced. Moreover, since the first grip member and the second grip member touch the object when the pressures of the first space and the second space are set to the atmospheric pressure, the frictional force between the object and each of the first holder and the second holder can be increased. Thus, in the process of holding the object, the frictional force between the object and each of the first holder and the second holder can be appropriately changed.

For example, the first space of the first holder may be filled with first particles; the second space of the second holder may be filled with second particles; a first deformable wall may be formed on a side surface of the first holder, cover the first space from a lateral side, and can contract when the pressure of the first space is reduced to be lower than the atmospheric pressure; and a second deformable wall may be formed on a side surface of the second holder, cover the second space from a lateral side, and can contract when the pressure of the second space is reduced to be lower than the atmospheric pressure.

With the aspect, the first deformable wall contracts when the pressure of the first space is reduced to be lower than the atmospheric pressure. Hence, restriction on the movement of the first particles in the first space, or what is called jamming transition phenomenon occurs, and the first holder can be hardened. Similarly, the second deformable wall contracts when the pressure of the second space is reduced to be lower than the atmospheric pressure, and the second holder can be hardened. Thus, in the process of holding the object, the first holder and the second holder can be appropriately hardened.

For example, the first holder may extend long from the proximal end to the distal end of the first holder; the second holder may extend long from the proximal end to the distal end of the second holder; and the robot hand apparatus may further include a guide member that is slidably supported by the supporter, that is arranged to cover the first holder and the second holder from lateral sides, and that adjusts the first position and the second position at which the first sucking surface and the second sucking surface are respectively bent; and a driver that slides the guide member in longitudinal directions of the first holder and the second holder.

With the aspect, the first position and the second position at which the first sucking surface and the second sucking surface are respectively bent can be easily adjusted by sliding the guide member.

For example, the first holder may have a first jet hole through which gas is jetted toward the object; and the second holder may have a second jet hole through which gas is jetted toward the object.

With the aspect, since the gas is jetted toward the object from the first jet hole and the second jet hole, the first holder and the second holder are lifted from the object, and thus the frictional force between the object and each of the first holder and the second holder can be appropriately changed.

For example, according to another aspect of the present disclosure, a robot hand system includes any one of the aforementioned robot hand apparatuses; a robot arm apparatus that supports the robot hand apparatus and that changes a position or a posture of the robot hand apparatus; a pressure regulating device that sucks air from the first holder and the second holder of the robot hand apparatus; and a controller that controls the robot arm apparatus and the pressure regulating device so that the robot hand apparatus holds the object.

With the aspect, by adjusting the first position and the second position at which the first sucking surface and the second sucking surface are respectively bent in accordance with the size of the object, the size of the region that sucks the object of each of the first sucking surface and the second sucking surface can be adjusted. Thus, the distal ends of the first holder and the second holder can be prevented from protruding from the ends of the object. For example, a target object can be correctly picked up from among densely arranged products.

For example, the robot hand system may further include an imaging device that image captures the object, in which the controller may judge a sucked region that can be sucked of a sucked surface of the object on the basis of a result of the image capture by the imaging device, and thus the distal ends of the first holder and the second holder may be pressed to the object so as not to protrude from the sucked region.

With the aspect, the distal ends of the first holder and the second holder can be prevented from protruding from the sucked region of the object.

According to still another aspect of the present disclosure, a holding method using a robot hand apparatus is provided. The robot hand apparatus includes a supporter a first holder with a proximal end thereof supported by the supporter, the first holder having a first sucking surface that is bendable at any position and that sucks an object using negative pressure; and a second holder with a proximal end thereof supported by the supporter, the second holder having a second sucking surface that is bendable at any position and that sucks the object using negative pressure, the first holder and the second holder being arranged such that the first sucking surface opposes the second sucking surface. The method includes touching distal ends of the first holder and the second holder on the object; pressing the distal ends of the first holder and the second holder to the object, and thus bending the first sucking surface and the second sucking surface respectively at a first position and a second position; and causing the object to be sucked to a region of the first sucking surface between the first position and the distal end of the first holder, and causing the object to be sucked to a region of the second sucking surface between the second position and the distal end of the second holder.

With the aspect, by adjusting the first position and the second position at which the first sucking surface and the second sucking surface are respectively bent, the size of the region that sucks the object of each of the first sucking surface and the second sucking surface can be adjusted.

For example, the holding method may further include image capturing the object using an imaging device; judging a sucked region that is included in a sucked surface of the object and that can be sucked to the first sucking surface of the first holder and the second sucking surface of the second holder; and determining the first position and the second position on the basis of a size of the sucked region.

With the aspect, the size of the region that sucks the object of each of the first sucking surface and the second sucking surface can be adjusted in accordance with the size of the object. Thus, the distal ends of the first holder and the second holder can be prevented from protruding from the ends of the object, and, for example, a target object can be correctly picked up from among densely arranged products.

It should be noted that the general or specific aspects may be implemented as a system, a method, an integrated circuit, a computer program, a computer-readable storage medium such as a CD-ROM, or any selective combination thereof.

Embodiments are specifically described below with reference to the drawings.

The embodiments to be described below each represent a general or specific example. The numerals, shapes, materials, components, arrangement positions and connection forms of the components, steps, the order of the steps described in the embodiments are merely examples and do not intend to limit the present disclosure. Among the components in the following embodiments, a component not described in the independent claim indicating the most general concept is described as an optional component.

First Embodiment 1-1. Configuration of Robot Hand System

Figure 2A:
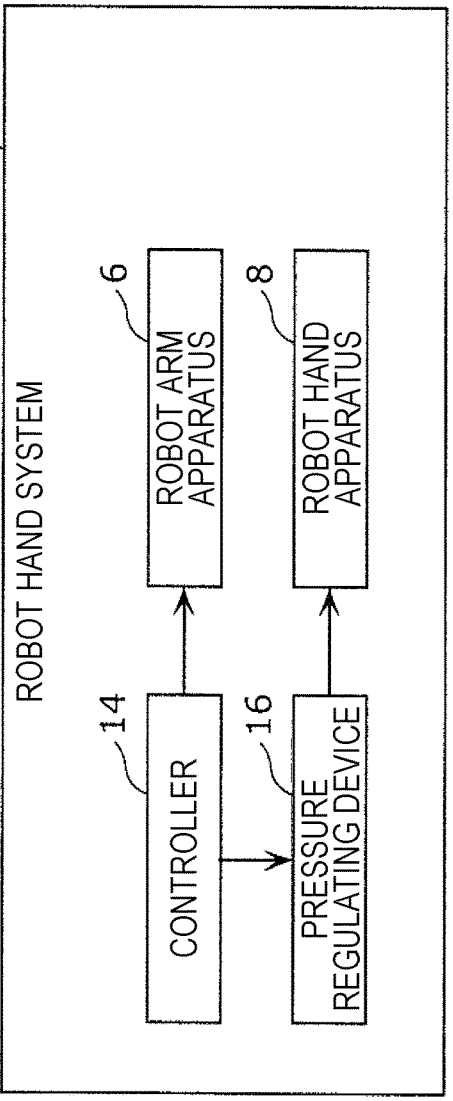
FIG. 2A is a block diagram illustrating a major functional configuration of the robot hand system according to the first embodiment.
Figure 2B:
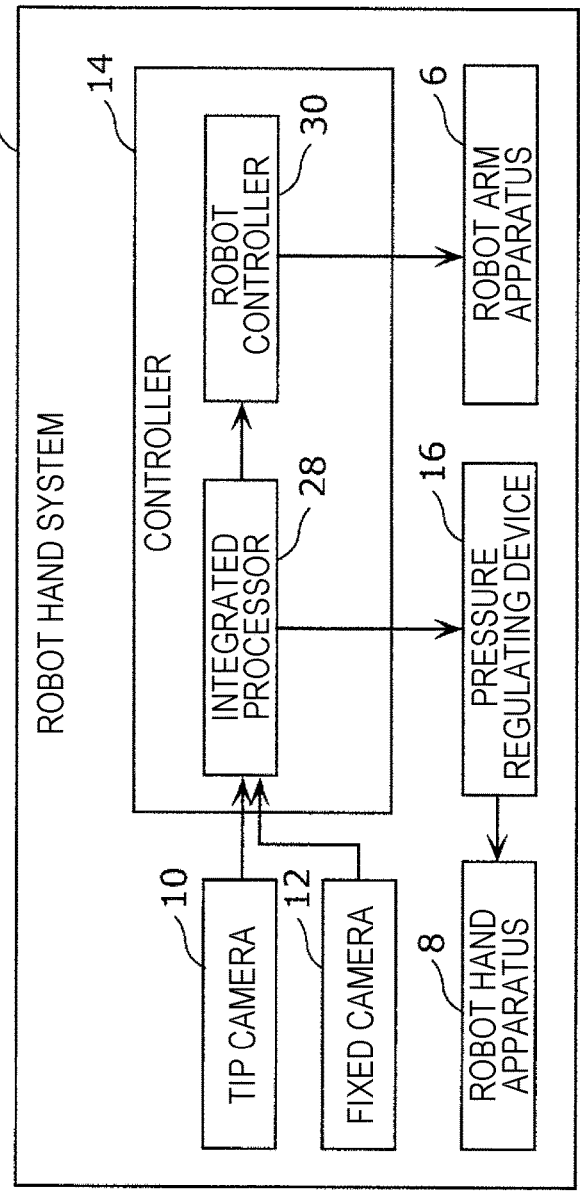
FIG. 2B is a block diagram illustrating a specific functional configuration of the robot hand system according to the first embodiment.
Figure 3:
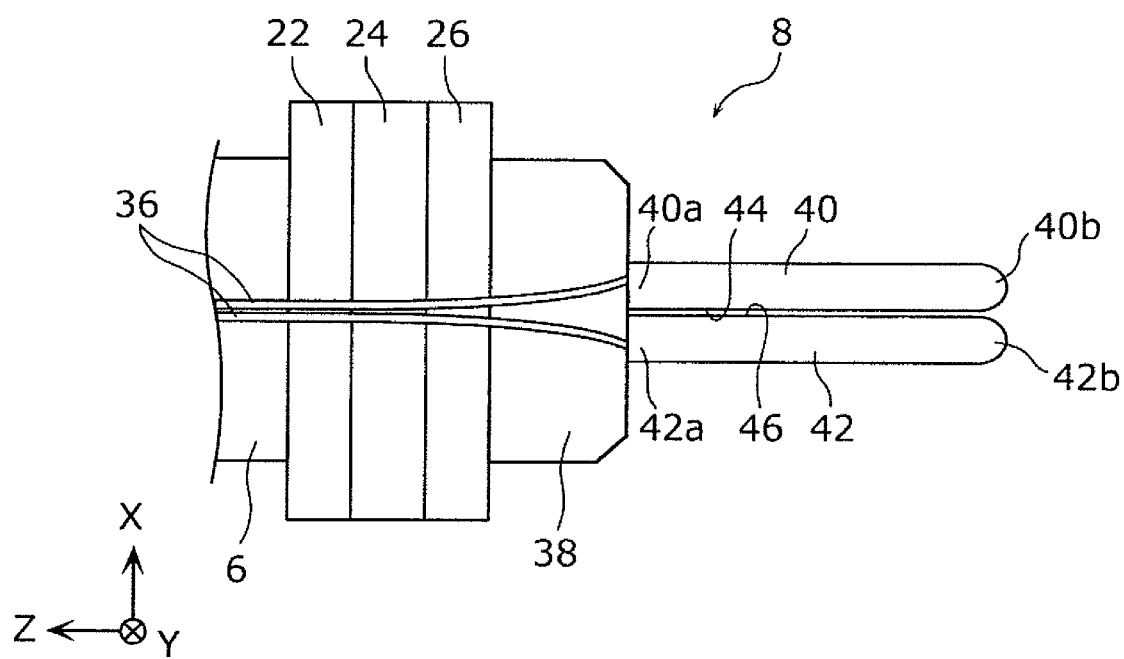
FIG. 3 illustrates a robot hand apparatus in an enlarged manner according to the first embodiment.

A configuration of a robot hand system 2 according to a first embodiment is described first with reference to FIGS. 1 to 3. FIG. 1 illustrates the configuration of the robot hand system 2 according to the first embodiment. FIG. 2A is a block diagram illustrating a major functional configuration of the robot hand system 2 according to the first embodiment. FIG. 2B is a block diagram illustrating a specific functional configuration of the robot hand system 2 according to the first embodiment. FIG. 3 illustrates a robot hand apparatus 8 in an enlarged manner according to the first embodiment.

As illustrated in FIGS. 1, 2A, and 2B, the robot hand system 2 according to the first embodiment is a system that picks up and conveys an object 4. The robot hand system 2 includes a robot arm apparatus 6, the robot hand apparatus 8, a tip camera 10 (an example of imaging device), a fixed camera 12, a controller 14, and a pressure regulating device 16.

The object 4 is a product such as a package box having any of various shapes and sizes. As illustrated in FIG. 1, products 20 are adjacently (densely) arranged on a palette 18 placed on a floor surface of, for example, a warehouse of a store. The object 4 is a product 20 which is a target to be picked up by the robot hand system 2 from among the products 20.

The robot arm apparatus 6 is formed of, for example, an articulated coordinate robot. The robot arm apparatus 6 changes the position or posture of the robot hand apparatus 8 with six degrees of freedom in a predetermined working area. As illustrated in FIG. 3, a hand mount 22 and a camera mount 24 are arranged at a distal end of the robot arm apparatus 6. Note that the robot arm apparatus 6 is not limited to the articulated coordinate robot, and may be formed of another type of robot.

As illustrated in FIGS. 1 and 3, the robot hand apparatus 8 is mounted to the distal end (the hand mount 22 and the camera mount 24) of the robot arm apparatus 6 via a mounting flange 26. The robot hand apparatus 8 sucks, for example, one product 20 as the object 4 using negative pressure from among the products 20. Thus, the robot hand apparatus 8 can hold the target object 4 from among the products 20. The configuration of the robot hand apparatus 8 is described later in detail.

As illustrated in FIGS. 1 and 3, the tip camera 10 is mounted to the camera mount 24 of the robot arm apparatus 6. The tip camera 10 image captures the object 4 existing in front of the robot hand apparatus 8. Note that FIG. 3 does not illustrate the tip camera 10 for the convenience of the description.

The fixed camera 12 is fixed to, for example, a ceiling of a room where the robot hand system 2 is installed. The fixed camera 12 image captures the robot hand apparatus 8, the object 4 existing in front of the robot hand apparatus 8, and a conveyance destination (for example, product shelf) of the object 4.

As illustrated in FIGS. 1 and 2B, the controller 14 has an integrated processor 28 and a robot controller 30. The integrated processor 28 transmits an operation command signal to the robot controller 30 and transmits a control signal to the pressure regulating device 16 on the basis of image information from the tip camera 10 and the fixed camera 12 and sensor information from various sensors (not illustrated). The robot controller 30 controls the operation of the robot arm apparatus 6 on the basis of the operation command signal from the integrated processor 28.

The pressure regulating device 16 has a vacuum pump 32 and a valve 34. As illustrated in FIGS. 1 and 3, the vacuum pump 32 communicates with a first space 54 (see FIG. 4B described later) of a first holder 40 and a second space 59 (see FIG. 4B described later) of a second holder 42 of the robot hand apparatus 8 via a pair of tubes 36. The vacuum pump 32 sucks air from the first space 54 of the first holder 40 and the second space 59 of the second holder 42 via the tubes 36 on the basis of the control signal from the integrated processor 28. The valve 34 is an on-off valve that opens the first space 54 of the first holder 40 and the second space 59 of the second holder 42 to the atmosphere, and is arranged at, for example, the vacuum pump 32. The valve 34 is opened and closed on the basis of the control signal from the integrated processor 28. When the valve 34 is closed and the vacuum pump 32 sucks air, for example, in a state in which the object 4 is in close contact with a first sucking surface 44 and a second sucking surface 46, the pressures of the first space 54 of the first holder 40 and the second space 59 of the second holder 42 are reduced to be lower than the atmospheric pressure, and vacuum sucks the object 4 in close contact. Then, when the valve 34 is opened, the pressures of the first space 54 of the first holder 40 and the second space 59 of the second holder 42 are restored to the atmospheric pressure, and the vacuum suction of the object 4 is released.

1-2. Configuration of Robot Hand Apparatus

Figure 4A:
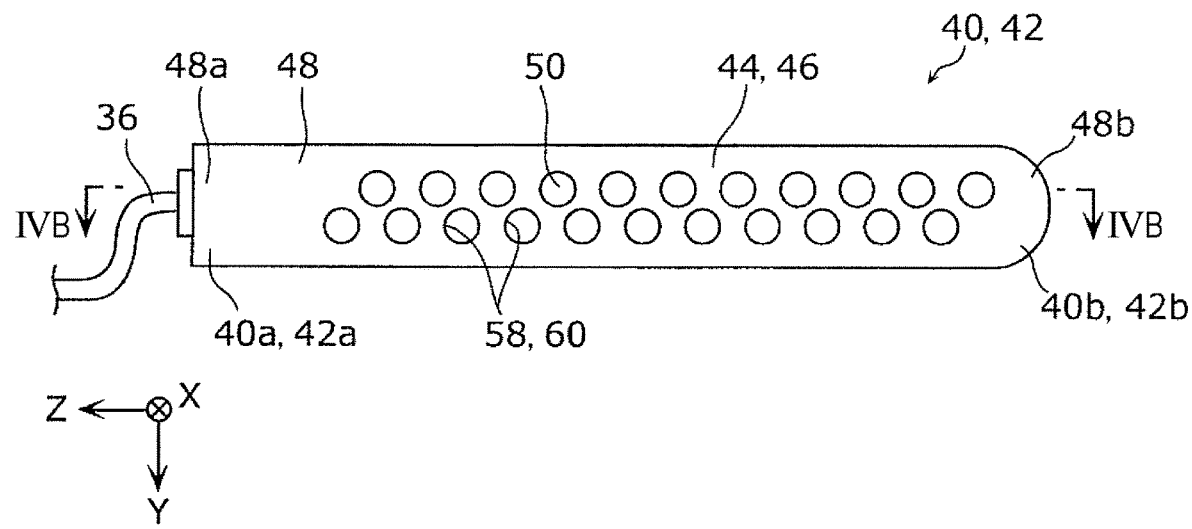
FIG. 4A is a plan view illustrating a first holder (second holder) of the robot hand apparatus according to the first embodiment.
Figure 4B:
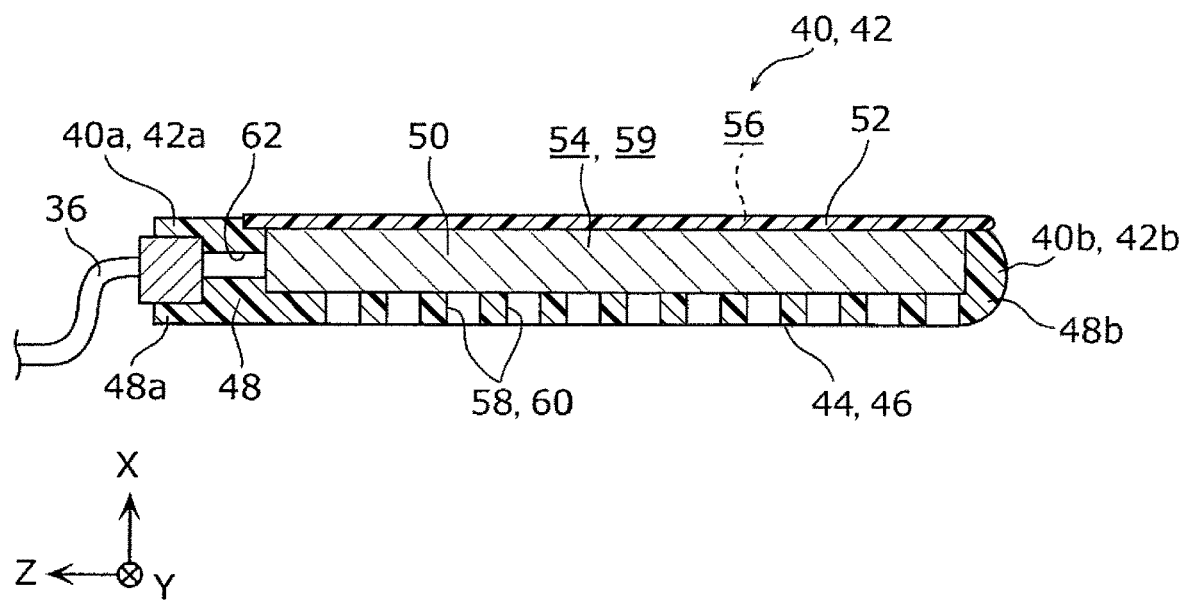
FIG. 4B is a cross-sectional view of the first holder (second holder) of the robot hand apparatus according to the first embodiment taken along line IVB-IVB of FIG. 4A.

A configuration of the robot hand apparatus 8 according to the first embodiment is described next with reference to FIGS. 3 to 4B. FIG. 4A is a plan view illustrating the first holder 40 (second holder 42) of the robot hand apparatus 8 according to the first embodiment. FIG. 4B is a cross-sectional view of the first holder 40 (second holder 42) of the robot hand apparatus 8 according to the first embodiment taken along line IVB-IVB of FIG. 4A.

As illustrated in FIG. 3, the robot hand apparatus 8 includes a hand supporter 38 (an example of supporter), the first holder 40, and the second holder 42.

The hand supporter 38 is a member that supports the first holder 40 and the second holder 42. The hand supporter 38 is mounted to the distal end (the hand mount 22 and the camera mount 24) of the robot arm apparatus 6 via the mounting flange 26.

The first holder 40 and the second holder 42 each are a flexible finger that sucks the object 4 using negative pressure. The first holder 40 extends long from a proximal end 40a to a distal end 40b. Similarly, the second holder 42 extends long from a proximal end 42a to a distal end 42b. The proximal end 40a of the first holder 40 and the proximal end 42a of the second holder 42 are supported by the hand supporter 38.

The first holder 40 and the second holder 42 respectively have the first sucking surface 44 and the second sucking surface 46 that suck the object 4 using negative pressure. The first holder 40 and the second holder 42 are arranged such that the first sucking surface 44 opposes the second sucking surface 46. The first sucking surface 44 has first sucking holes 58 (see FIG. 4A described later). The second sucking surface 46 has second sucking holes 60 (see FIG. 4A described later). In a state in which both the first sucking surface 44 and the second sucking surface 46 are not bent, the first sucking surface 44 and the second sucking surface 46 may be in contact with each other, or a gap of, for example, about several millimeters may be formed between the first sucking surface 44 and the second sucking surface 46.

The first holder 40 and the second holder 42 have the same configuration. Hence, the configuration of the first holder 40 is described below.

As illustrated in FIGS. 4A and 4B, the first holder 40 has an elastic member 48, a filling member 50, and a sealing member 52.

The elastic member 48 is formed of an elastic soft resin, for example, an elastomer such as silicone rubber. The elastic member 48 is a member serving as a base of the first holder 40. The elastic member 48 extends long from a proximal end 48a to a distal end 48b. The first space 54 which extends in the longitudinal direction (Z-axis direction) of the elastic member 48 is formed in the elastic member 48. An opening 56 through which the first space 54 communicates with the outside is formed at a side surface of the elastic member 48.

Also, the first sucking surface 44 is formed at a side surface of the elastic member 48 on the side opposite to the opening 56. The first sucking surface 44 is bendable in a mountain fold manner at any position in the longitudinal direction of the elastic member 48. The first sucking surface 44 has the first sucking holes 58 which are circular in plan view and through which the first space 54 communicates with the outside. The first sucking holes 58 are arranged in a staggered manner in the longitudinal direction of the elastic member 48. The first sucking holes 58 and the second sucking holes 60 may be arranged so as not to overlap each other in the state in which the first sucking surface 44 and the second sucking surface 46 are in contact with each other. Thus, when air is sucked in the state in which the first sucking holes 58 oppose the second sucking holes 60, the first sucking surface 44 and the second sucking surface 46 can be in close contact with each other so as to close the first sucking holes 58 and the second sucking holes 60.

The proximal end 48a of the elastic member 48 is supported by the hand supporter 38. A connection hole 62 through which the first space 54 communicates with the outside is formed at the proximal end 48a of the elastic member 48. An end of corresponding one of the tubes 36 is connected to the connection hole 62.

The filling member 50 is a member that prevents the first space 54 of the elastic member 48 from being deformed when the pressure of the first space 54 is reduced to be lower than the atmospheric pressure. The filling member 50 is formed of a flexible and breathable material, and is filled in the first space 54 of the elastic member 48.

The sealing member 52 is a thin-plate member that seals the opening 56 of the elastic member 48. The sealing member 52 is formed of an elastic soft resin, for example, an elastomer such as silicone rubber. The sealing member 52 is arranged so as to cover the first space 54 from a lateral side. Thus, the first space 54 is formed in a region surrounded by the elastic member 48 and the sealing member 52.

1-3. Operation of Robot Hand System

Figure 5:
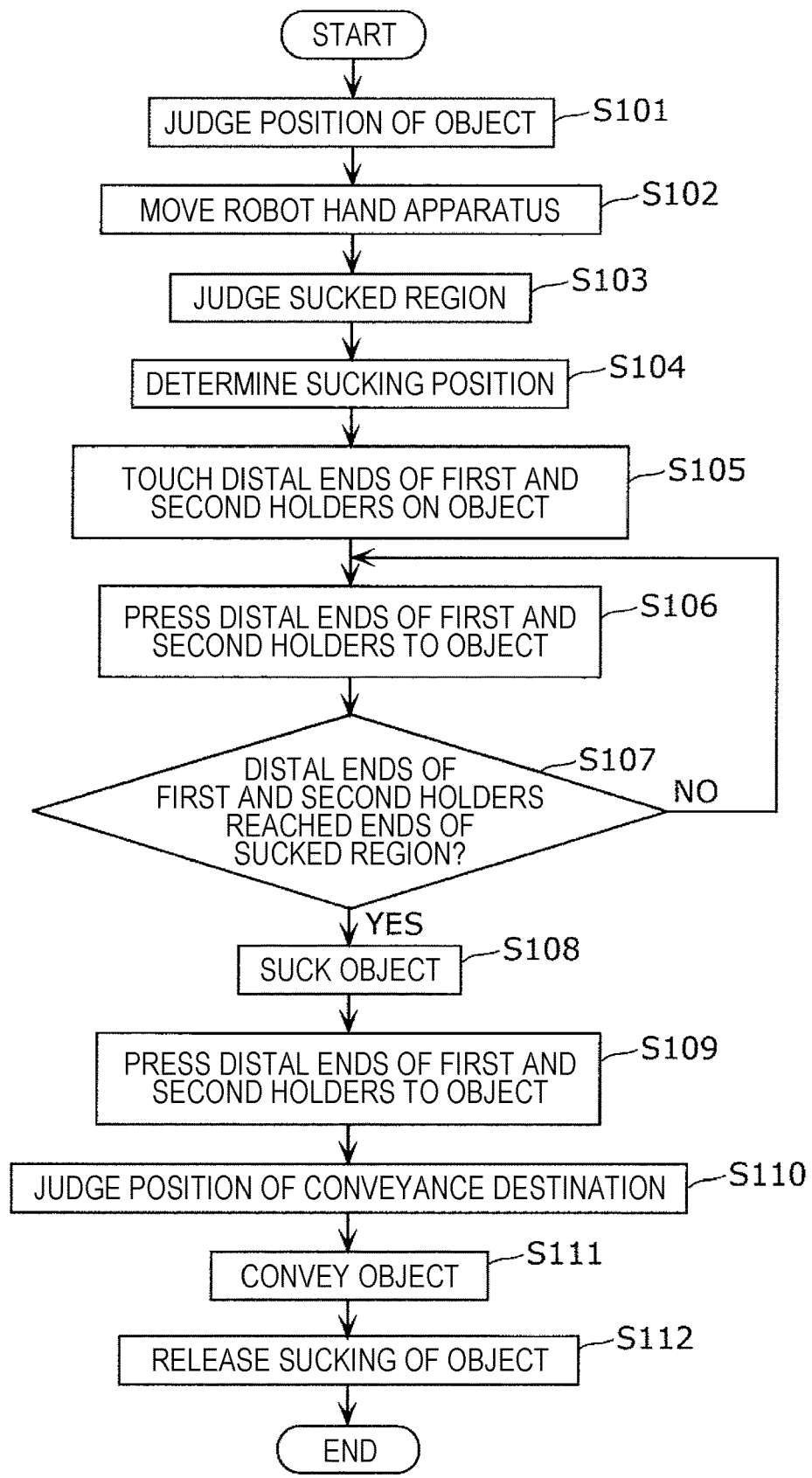
FIG. 5 is a flowchart showing a flow of operation of the robot hand system according to the first embodiment.
Figure 6:
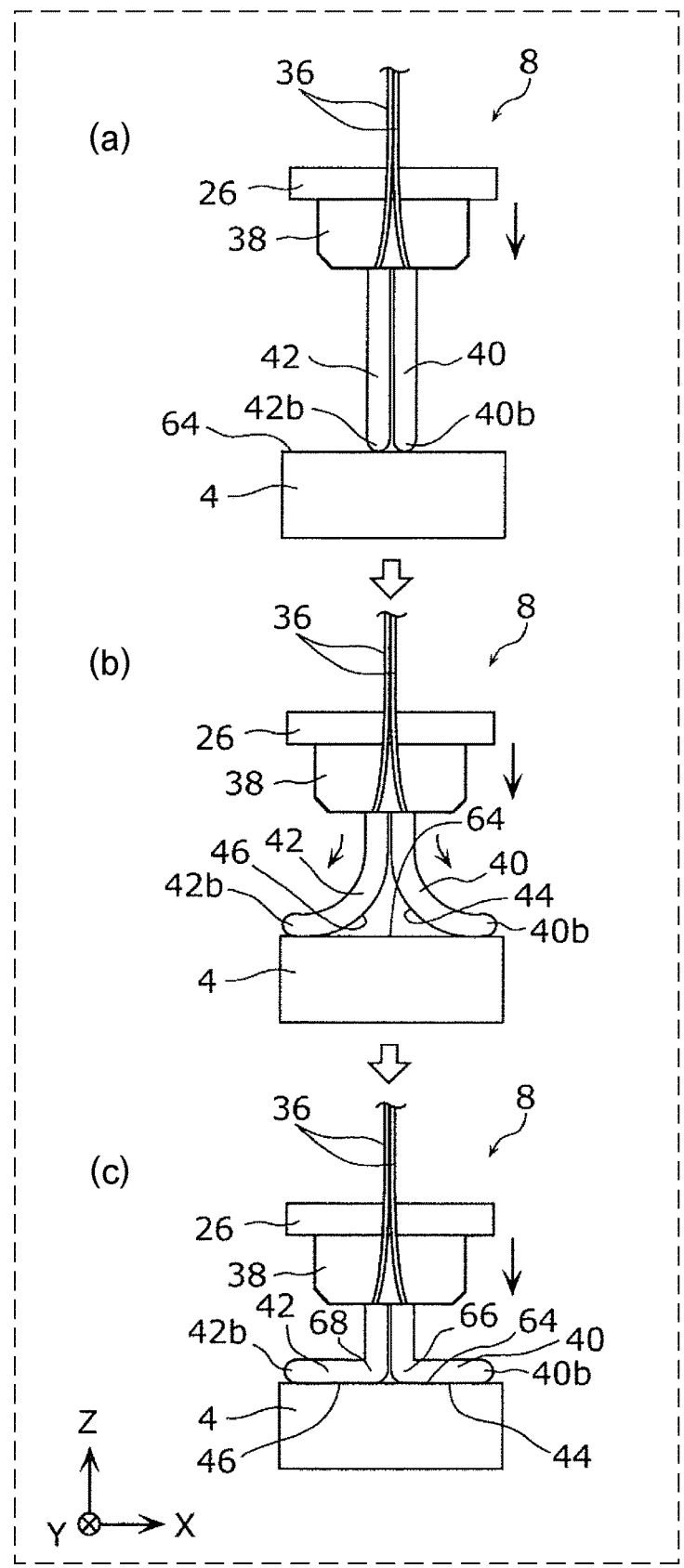
FIG. 6 illustrates the flow of the operation of the robot hand system according to the first embodiment.

Operation of the robot hand system 2 according to the first embodiment is described next with reference to FIGS. 5 and 6. FIG. 5 is a flowchart showing a flow of the operation of the robot hand system 2 according to the first embodiment. FIG. 6 illustrates the flow of the operation of the robot hand system 2 according to the first embodiment.

As illustrated in FIG. 5, first, the integrated processor 28 of the controller 14 judges the position of the object 4 to be conveyed on the basis of the image information from the fixed camera 12 (S101). Then, the integrated processor 28 transmits the operation command signal to the robot controller 30 on the basis of the position of the object 4. The robot controller 30 controls the operation of the robot arm apparatus 6 on the basis of the operation command signal from the integrated processor 28, to move the robot hand apparatus 8 to a position just above the upper surface of the object 4 (S102). At this time, the robot hand apparatus 8 is held in a posture in which the longitudinal directions of the first holder 40 and the second holder 42 are substantially parallel to the vertical direction (Z-axis direction).

Then, the integrated processor 28 judges a region 64 that can be sucked of the upper surface of the object 4 (hereinafter, referred to as "sucked region 64") on the basis of the image information from the tip camera 10 (S103), and determines the sucking positions of the first holder 40 and the second holder 42 in the sucked region 64 (S104). The integrated processor 28 transmits the operation command signal to the robot controller 30 on the basis of the determined sucking positions. The robot controller 30 controls the operation of the robot arm apparatus 6 on the basis of the operation command signal from the integrated processor 28. Thus, as illustrated in FIG. 6(a), the robot hand apparatus 8 is lowered, and the distal end 40b of the first holder 40 and the distal end 42b of the second holder 42 touch the sucked region 64 of the object 4 (S105).

As illustrated in FIG. 6(b), the robot hand apparatus 8 is further lowered, and the distal end 40b of the first holder 40 and the distal end 42b of the second holder 42 are pressed to the sucked region 64 of the object 4 (S106). At this time, the distal end 40b of the first holder 40 and the distal end 42b of the second holder 42 move in a direction away from each other while sliding on the sucked region 64, and hence the first holder 40 and the second holder 42 are bent such that the first sucking surface 44 and the second sucking surface 46 define protruding surfaces. The distal end 40b of the first holder 40 and the distal end 42b of the second holder 42 are continuously pressed to the sucked region 64 of the object 4 (S106) until the distal end 40b of the first holder 40 and the distal end 42b of the second holder 42 reach ends of the sucked region 64 (NO in S107). At this time, the first sucking surface 44 and the second sucking surface 46 partly touch the sucked region 64.

When the distal end 40b of the first holder 40 and the distal end 42b of the second holder 42 have reached the ends of the sucked region 64 (YES in S107), the integrated processor 28 transmits the control signal to the pressure regulating device 16 on the basis of the image information from the tip camera 10. With the signal, the vacuum pump 32 is driven in a state in which the valve 34 is closed, and air is sucked through the first sucking holes 58 of the first sucking surface 44 and the second sucking holes 60 of the second sucking surface 46. Consequently, the first sucking surface 44 and the second sucking surface 46 partly suck the sucked region 64 using negative pressure (S108), and the distal end 40b of the first holder 40 and the distal end 42b of the second holder 42 are fixed at positions so as not to protrude from the ends of the sucked region 64.

In this state, the distal end 40b of the first holder 40 and the distal end 42b of the second holder 42 are further pressed to the sucked region 64 of the object 4 (S109), and hence, as illustrated in FIG. 6(c), the first sucking surface 44 and the second sucking surface 46 are respectively bent at substantially right angle at a first position 66 and a second position 68. Thus, a region of the first sucking surface 44 between the first position 66 and the distal end 40b of the first holder 40 sucks the sucked region 64 using negative pressure, and a region of the second sucking surface 46 between the second position 68 and the distal end 42b of the second holder 42 sucks the sucked region 64 using negative pressure. In this way, the object 4 is held by the first holder 40 and the second holder 42, and is picked up from the palette 18.

At this time, a region of the first sucking surface 44 between the first position 66 and the proximal end 40a of the first holder 40, and a region of the second sucking surface 46 between the second position 68 and the proximal end 42a of the second holder 42 are in contact (close contact) with each other. Thus, all the first sucking holes 58 and the second sucking holes 60 are closed, and the object 4 can be stably sucked. Note that, in this case, the driving of the vacuum pump 32 may be stopped in the state in which the valve 34 is closed.

Then, the integrated processor 28 of the controller 14 judges the position of the conveyance destination of the object 4 on the basis of the image information from the fixed camera 12 (S110). Then, the integrated processor 28 transmits the operation command signal to the robot controller 30 on the basis of the position of the conveyance destination of the object 4. The robot controller 30 controls the operation of the robot arm apparatus 6 on the basis of the operation command signal from the integrated processor 28, to move the robot hand apparatus 8 to the conveyance destination in a state in which the object 4 is held by the first holder 40 and the second holder 42. Thus, the object 4 is conveyed to the conveyance destination (S111).

In this case, the integrated processor 28 judges a region that can store the object 4 (hereinafter, referred to as "storage region") at the conveyance destination on the basis of the image information from the tip camera 10. The integrated processor 28 transmits the control signal to the pressure regulating device 16 when the integrated processor 28 judges that the object 4 has been stored in the storage region on the basis of the image information from the tip camera 10. With the signal, the driving of the vacuum pump 32 is stopped, the valve 34 is opened, and the sucking of the object 4 to the first sucking surface 44 and the second sucking surface 46 is released (S112). At this time, the first sucking surface 44 and the second sucking surface 46 are restored from the state bent at the first position 66 and the second position 68 (the state illustrated in FIG. 6(c)) to the original straight state (the state illustrated in FIG. 6(a)) due to the elastic restoring force of the elastic member 48.

1-4. Advantages

By adjusting the first position 66 and the second position 68 at which the first sucking surface 44 and the second sucking surface 46 are respectively bent as described above in accordance with the size of the object 4, the sizes of the regions of the first sucking surface 44 and the second sucking surface 46 that suck the object 4 can be adjusted. Thus, the distal end 40b of the first holder 40 and the distal end 42b of the second holder 42 can be prevented from protruding from the ends of the sucked region 64 of the object 4. For example, a target object 4 can be correctly picked up from among densely arranged products 20.

Also, by using the force of pressing the distal end 40b of the first holder 40 and the distal end 42b of the second holder 42 to the sucked region 64 of the object 4, the first sucking surface 44 and the second sucking surface 46 are bent. Thus, a driving device such as an actuator that bends the first sucking surface 44 and the second sucking surface 46 is not required to be mounted on the robot hand apparatus 8, and the robot hand apparatus 8 can be downsized.

In this embodiment, the sucked region 64 that can be sucked of the upper surface of the object 4 is judged on the basis of the image information from the tip camera 10; however, information on the weight of the object 4 may be acquired in advance, and the size of the sucked region 64 of the object 4 may be determined on the basis of the information.

1-5. Use Example

Figure 7A:
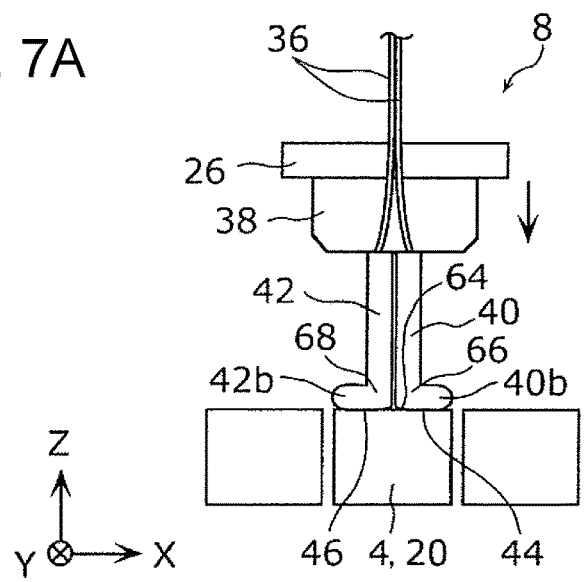
FIG. 7A illustrates use example 1 of the robot hand system according to the first embodiment.
Figure 7B:
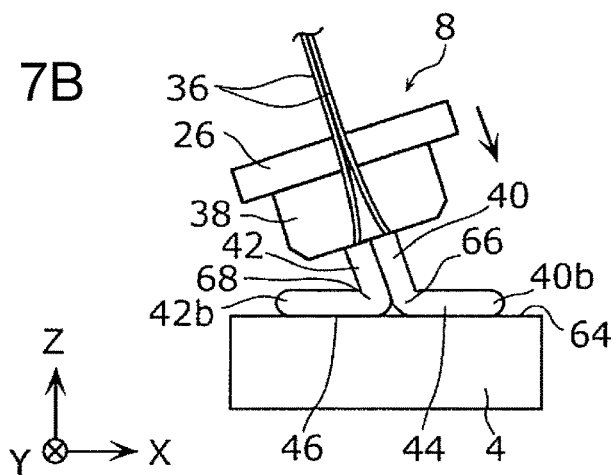
FIG. 7B illustrates use example 2 of the robot hand system according to the first embodiment.
Figure 7C:
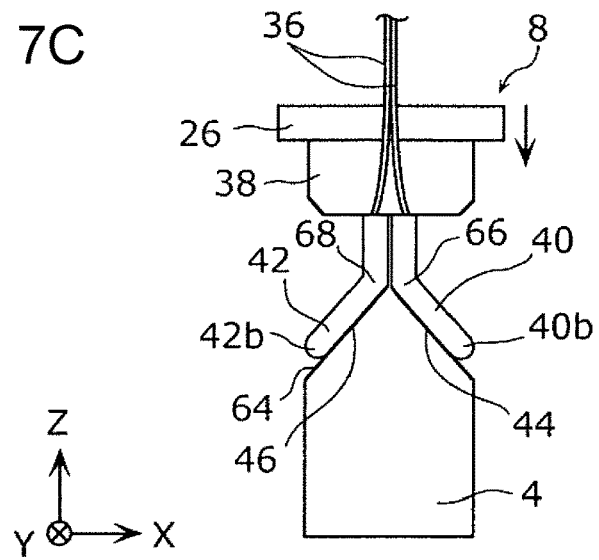
FIG. 7C illustrates use example 3 of the robot hand system according to the first embodiment.

Use examples of the robot hand system 2 according to the first embodiment are described next with reference to FIGS. 7A to 7C. FIG. 7A illustrates use example 1 of the robot hand system 2 according to the first embodiment. FIG. 7B illustrates use example 2 of the robot hand system 2 according to the first embodiment. FIG. 7C illustrates use example 3 of the robot hand system 2 according to the first embodiment.

As illustrated in FIG. 7A, in use example 1, products 20 with relatively small sizes are densely arranged. In this case, the first sucking surface 44 is bent at a first position 66 near the distal end 40b of the first holder 40, and the second sucking surface 46 is bent at a second position 68 near the distal end 42b of the second holder 42. Thus, since the distal end 40b of the first holder 40 and the distal end 42b of the second holder 42 can be prevented from protruding from ends of a sucked region 64 of an object 4, a target object 4 can be correctly picked up from among the products 20.

As illustrated in FIG. 7B, in use example 2, the posture of the robot hand apparatus 8 is tilted with respect to a sucked region 64 of an object 4. In this case, since the angles at which the first sucking surface 44 and the second sucking surface 46 are bent can be desirably adjusted, the object 4 can be reliably sucked to the first sucking surface 44 and the second sucking surface 46. Thus, for example, even when the posture of the robot hand apparatus 8 cannot be freely changed in a narrow space, such as the inside of a product shelf or the inside of a package box, an object 4 can be reliably sucked.

As illustrated in FIG. 7C, in use example 3, the upper surface of an object 4 is not flat but has a mountain-like shape having two nonparallel surfaces. In this case, since the angles at which the first sucking surface 44 and the second sucking surface 46 are bent can be desirably adjusted, the object 4 can be reliably sucked to the first sucking surface 44 and the second sucking surface 46. As described above, even when the first sucking surface 44 and the second sucking surface 46 are tilted with respect to the vertical direction (Z-axis direction), an object 4 can be reliably sucked. This configuration is particularly useful, for example, when the portion that can suck an object 4 is limited because of an obstacle or the like.

Second Embodiment 2-1. Configuration of Robot Hand Apparatus

Figure 8:
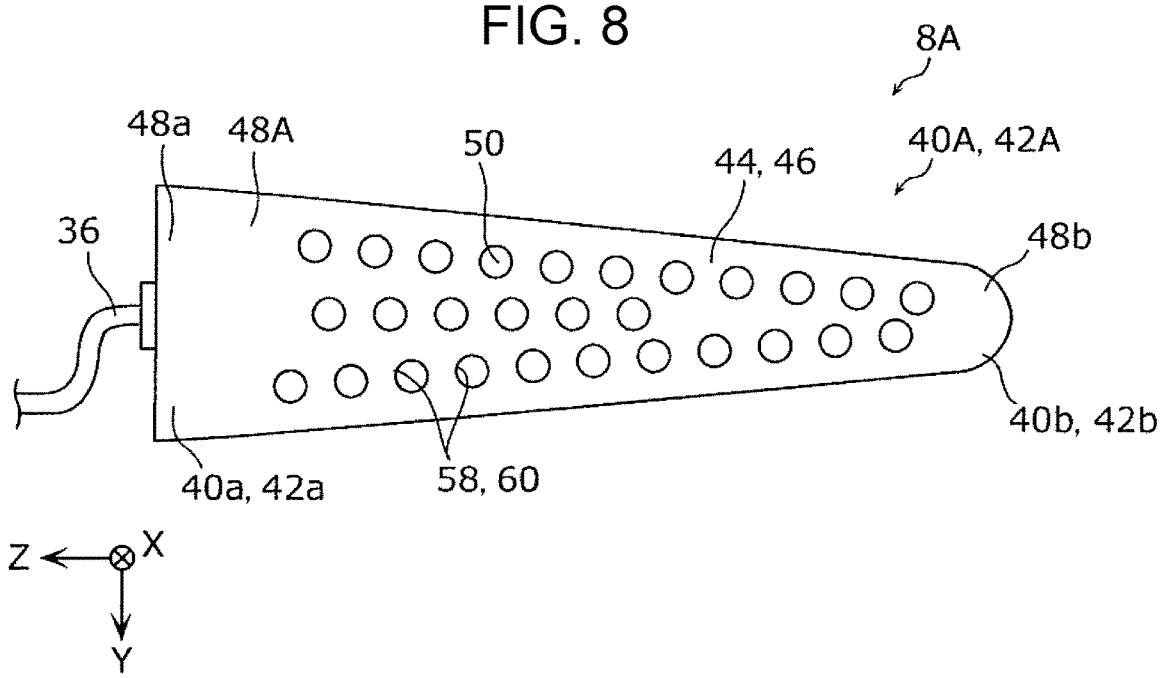
FIG. 8 is a plan view illustrating a first holder (second holder) of a robot hand apparatus according to a second embodiment.

A robot hand apparatus 8A according to a second embodiment is described next with reference to FIG. 8. FIG. 8 is a plan view illustrating a first holder 40A (second holder 42A) of the robot hand apparatus 8A according to the second embodiment. In any of the embodiments described below, the same reference signs are applied to the same components as those of the first embodiment, and the redundant description thereof is omitted.

As illustrated in FIG. 8, in the robot hand apparatus 8A according to the second embodiment, the configurations of the first holder 40A and the second holder 42A differ from those of the first embodiment. Specifically, the width in a direction (Y-axis direction) perpendicular to the longitudinal direction (Z-axis direction) of an elastic member 48A of the first holder 40A gradually decreases from the proximal end 48a to the distal end 48b. That is, the elastic member 48A of the first holder 40A has a substantially triangular shape in plan view. The second holder 42A is also configured similarly to the first holder 40A.

2-2. Advantages

Since the first holder 40A has the above-described shape, the first sucking surface 44 can be easily bent at a position near the distal end 40b of the first holder 40A. A similar advantage can be obtained also for the second holder 42A.

Instead of the above-described configuration, the thickness in a direction (X-axis direction) perpendicular to the longitudinal direction of the elastic member 48A of the first holder 40A may gradually decrease from the proximal end 48a to the distal end 48b. Alternatively, the elastic member 48A may be formed of a material whose hardness gradually decreases from the proximal end 48a toward the distal end 48b. Even with such a configuration, an advantage similar to the described advantages can be obtained.

Third Embodiment 3-1. Configuration of Robot Hand Apparatus

Figure 9:
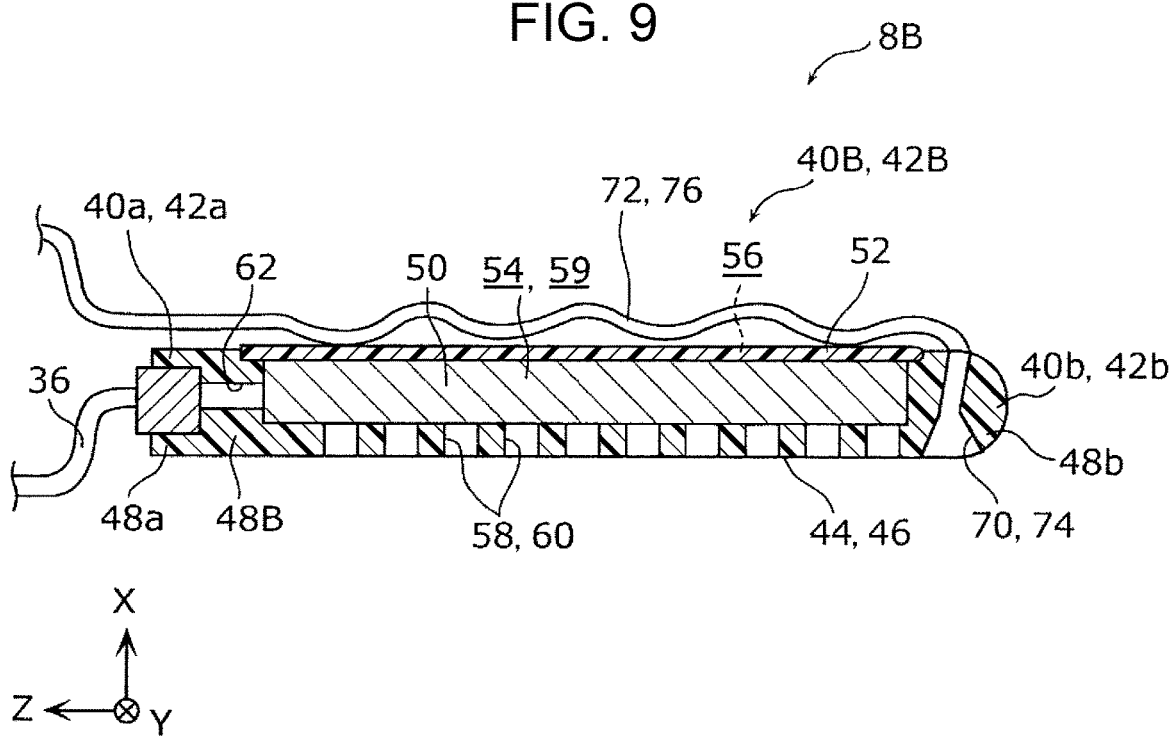
FIG. 9 is a cross-sectional view illustrating a first holder (second holder) of a robot hand apparatus according to a third embodiment.

A robot hand apparatus 8B according to a third embodiment is described next with reference to FIG. 9. FIG. 9 is a cross-sectional view illustrating a first holder 40B (second holder 42B) of the robot hand apparatus 8B according to the third embodiment.

As illustrated in FIG. 9, in the robot hand apparatus 8B according to the third embodiment, the configurations of the first holder 40B and the second holder 42B differ from those of the first embodiment. Specifically, a first sucker 70 that sucks the object 4 (see FIG. 6) using negative pressure independently from the first sucking surface 44 is formed at the distal end of the first holder 40B. The first sucker 70 is a through-hole extending through the distal end 48b of an elastic member 48B of the first holder 40B in the thickness direction (X-axis direction). One opening of the first sucker 70 is formed in the first sucking surface 44. The other opening of the first sucker 70 communicates with the vacuum pump 32 via a tube 72. By switching a valve (not illustrated) arranged at the vacuum pump 32, air can be sucked through the first sucker 70 independently from the first sucking holes 58.

Similarly, a second sucker 74 that sucks the object 4 using negative pressure independently from the second sucking surface 46 is formed at the distal end of the second holder 42B. One opening of the second sucker 74 is formed in the second sucking surface 46. The other opening of the second sucker 74 communicates with the vacuum pump 32 via a tube 76. By switching a valve (not illustrated) arranged at the vacuum pump 32, air can be sucked through the second sucker 74 independently from the second sucking holes 60.

3-2. Advantages

When the distal end 40b of the first holder 40B and the distal end 42b of the second holder 42B have reached the ends of the sucked region 64 of the object 4 (see FIG. 6), the integrated processor 28 (see FIG. 1) transmits the control signal to the pressure regulating device 16 (see FIG. 1) on the basis of the image information from the tip camera 10 (see FIG. 1). Hence, the vacuum pump 32 is driven in a state in which the valve is switched, and air is sucked through the first sucker 70 and the second sucker 74.

Consequently, since the distal end 40b of the first holder 40B and the distal end 42b of the second holder 42B suck the sucked region 64 using negative pressure, when the distal ends 40b and 42b are pressed to the sucked region 64, the distal ends 40b and 42b can be prevented from sliding on the sucked region 64.

3-3. Modifications

In this embodiment, by sucking air through the first sucker 70 and the second sucker 74, when the distal ends 40b and 42b are pressed to the sucked region 64, the distal ends 40b and 42b are prevented from sliding on the sucked region 64. Instead of such a configuration, the distal ends 40b and 42b may be formed of a material with large frictional force, and air (an example of gas) may be jetted from the first sucker 70 and the second sucker 74 to reduce the frictional force.

In this case, the first sucker 70 and the second sucker 74 are respectively used as a first jet hole and a second jet hole through which air is jetted. The first jet hole and the second jet hole communicate with a compressor (not illustrated) provided in the pressure regulating device 16 via the tubes 72 and 76. Air from the compressor is supplied to the first jet hole and the second jet hole via the tubes 72 and 76, and air is jetted from the first jet hole and the second jet hole. Thus, the distal end 40b of the first holder 40B and the distal end 42b of the second holder 42B are lifted from the sucked region 64, and can slide on the sucked region 64 as required. Also, by stopping the air jet, the distal ends 40b and 42b with large frictional force are brought into close contact with the sucked region 64, and can be prevented from sliding on the sucked region 64.

If air from each of the first sucking hole 58 and the second sucking hole 60 is jetted in a direction tilted with respect to the sucked region 64 of the object 4, the object 4 can be sucked by a non-contact sucking method (what is called Bernoulli method). The sucking by the non-contact sucking method allows the object 4 to slide without friction in the horizontal direction while the object 4 is sucked in the vertical direction, and hence this is useful when the frictional force with respect to the object 4 is changed.

Fourth Embodiment 4-1. Configuration of Robot Hand Apparatus

Figure 11:
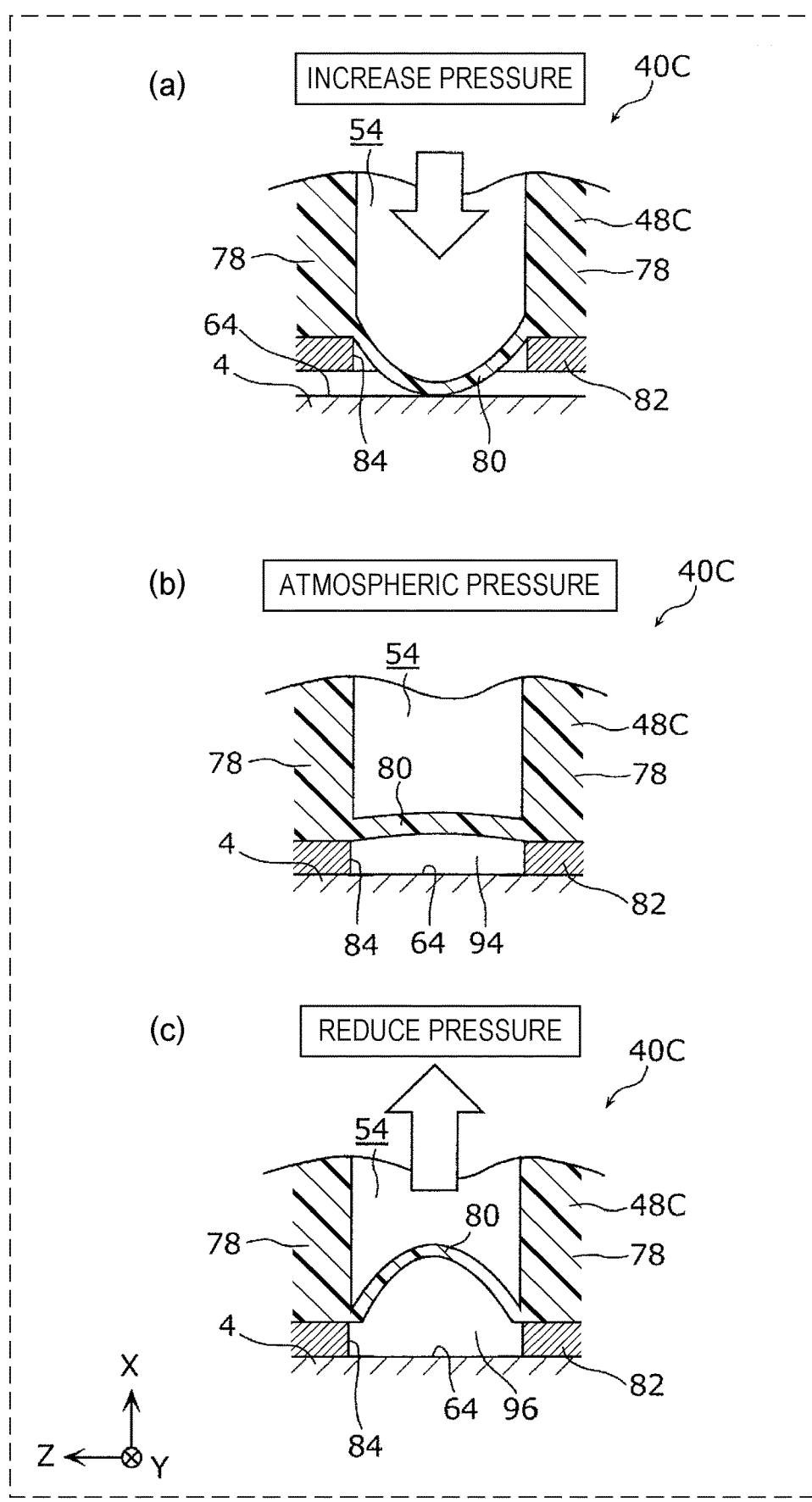
FIG. 11 illustrates cross-sectional views in an enlarged manner of a first thin portion of the robot hand apparatus according to the fourth embodiment.

A robot hand apparatus 8C according to a fourth embodiment is described next with reference to FIGS. 10A to 11. FIG. 10A is a plan view illustrating a first holder 40C (second holder 42C) of the robot hand apparatus 8C according to the fourth embodiment. FIG. 10B is a cross-sectional view of the first holder 40C (second holder 42C) of the robot hand apparatus 8C according to the fourth embodiment taken along line XB-XB of FIG. 10A. FIG. 11 illustrates cross-sectional views in an enlarged manner of a first thin portion 80 of the robot hand apparatus 8C according to the fourth embodiment.

As illustrated in FIGS. 10A and 10B, in the robot hand apparatus 8C according to the fourth embodiment, the configurations of the first holder 40C and the second holder 42C differ from those of the first embodiment. Specifically, the frictional force between the sucked region 64 of the object 4 and each of the first holder 40C and the second holder 42C can be changed.

An elastic member 48C of the first holder 40C is formed of a material having relatively small frictional force. A first sucking surface 44C of the elastic member 48C has first thick portions 78 and first thin portions 80 having a thickness (a size in the X-axis direction) smaller than the thickness of the first thick portions 78. That is, the first sucking surface 44C has a structure that is closed in the entire region. As illustrated in FIG. 10A, the first thin portions 80 are circular in plan view.

The first sucking surface 44C is covered with a first grip member 82. The first grip member 82 has a plate shape, and is formed of a material having frictional force larger than the frictional force of the elastic member 48C (first thin portions 80). The first grip member 82 has first openings 84 at positions corresponding to the first thin portions 80 to expose the first thin portions 80 to the outside. As illustrated in FIG. 10A, the first openings 84 are circular in plan view.

Similarly, an elastic member 48C of the second holder 42C is formed of a material having relatively small frictional force. A second sucking surface 46C of the elastic member 48C has second thick portions 86 and second thin portions 88 having a thickness smaller than the thickness of the second thick portions 86. That is, the second sucking surface 46C is closed in the entire region. As illustrated in FIG. 10A, the second thin portions 88 are circular in plan view.

The second sucking surface 46C is covered with a second grip member 90. The second grip member 90 has a plate shape, and is formed of a material having frictional force larger than the frictional force of the elastic member 48C (second thin portions 88). The second grip member 90 has second openings 92 at positions corresponding to the second thin portions 88 to expose the second thin portions 88 to the outside. As illustrated in FIG. 10A, the second openings 92 are circular in plan view.

Further, the pressure regulating device 16 (see FIG. 1) has a compressor (not illustrated) in addition to the vacuum pump 32 and the valve 34. The compressor communicates with the first space 54 of the first holder 40C and the second space 59 of the second holder 42C of the robot hand apparatus 8C via the pair of tubes 36. The compressor supplies air to each of the first space 54 of the first holder 40C and the second space 59 of the second holder 42C via the pair of tubes 36 on the basis of the operation command signal from the integrated processor 28 (see FIG. 1). Since the compressor supplies air in the state in which the valve 34 is closed, the pressures of the first space 54 of the first holder 40C and the second space 59 of the second holder 42C are increased to be higher than the atmospheric pressure. Then, when the valve 34 is opened, the pressures of the first space 54 of the first holder 40C and the second space 59 of the second holder 42C are restored to the atmospheric pressure.

Thus, each of the first space 54 of the first holder 40C and the second space 59 of the second holder 42C is switched among the state a) in which the pressure is increased to be higher than the atmospheric pressure, the state b) in which the pressure is set to the atmospheric pressure, and the state c) in which the pressure is reduced to be lower than the atmospheric pressure by the pressure regulating device 16.

The principle of changing the frictional force between the first holder 40C and the sucked region 64 of the object 4 is described below with reference to FIG. 11.

In the state illustrated in FIG. 11($a$), the pressure of the first space 54 of the first holder 40C is increased to be higher than the atmospheric pressure by the pressure regulating device 16. In this case, the first thin portion 80 is deformed to protrude toward the side opposite to the first space 54, and hence touches the sucked region 64 of the object 4 via the first opening 84. Thus, the frictional force between the first holder 40C and the sucked region 64 of the object 4 becomes relatively small.

In the state illustrated in FIG. 11($b$), the pressure of the first space 54 of the first holder 40C is set to the atmospheric pressure by the pressure regulating device 16. In this case, the location of the first thin portion 80 is nearer to the location of the first space 54 than the first opening 84, and hence the first grip member 82 touches the sucked region 64 of the object 4. Thus, the frictional force between the first holder 40C and the sucked region 64 of the object 4 becomes relatively large.

In the state illustrated in FIG. 11($c$), the pressure of the first space 54 of the first holder 40C is reduced to be lower than the atmospheric pressure by the pressure regulating device 16. In this case, the first thin portion 80 is deformed to protrude toward the first space 54, and hence the first grip member 82 touches the sucked region 64 of the object 4. Thus, the area between the first thin portion 80 and the object 4 is in vacuum state, and the first thin portion 80 sucks the sucked region 64 of the object 4 using negative pressure.

The principle of the sucking is described in further detail. In the state illustrated in FIG. 11($b$), a space 94 is formed between the first thin portion 80 and the sucked region 64 of the object 4. In the state illustrated in FIG. 11($c$), a space 96 larger than the space 94 is formed between the first thin portion 80 and the sucked region 64 of the object 4. When the volume of the space is increased in this way, the pressure is reduced according to Boyle-Charles' law, and the object 4 can be sucked using negative pressure. Note that, since the first thin portion 80 has the elastic restoring force, when P1 is the pressure of the first space 54, P2 is the pressure of the space 96, and P3 is the pressure of the first thin portion 80, the relation P1=P2+P3 is established and the pressures are in balance. Also, when S is the area of the space 96, the sucking force F is S×P2.

The principle of changing the frictional force between the second holder 42C and the sucked region 64 of the object 4 is similar to the above-described principle, and hence the redundant description is omitted.

4-2. Operation of Robot Hand System

Figure 12:
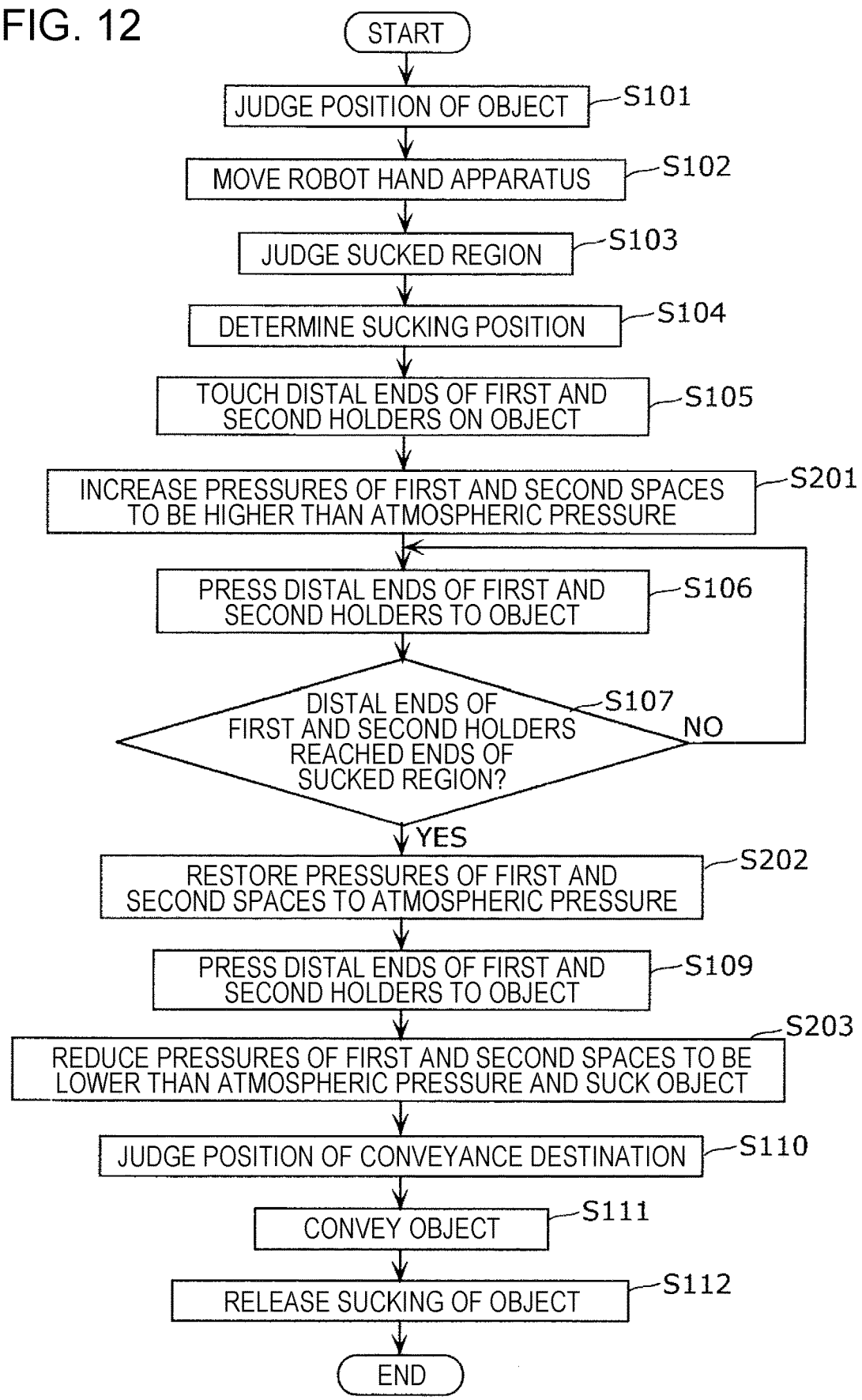
FIG. 12 is a flowchart showing a flow of operation of a robot hand system according to the fourth embodiment.
Figure 13:
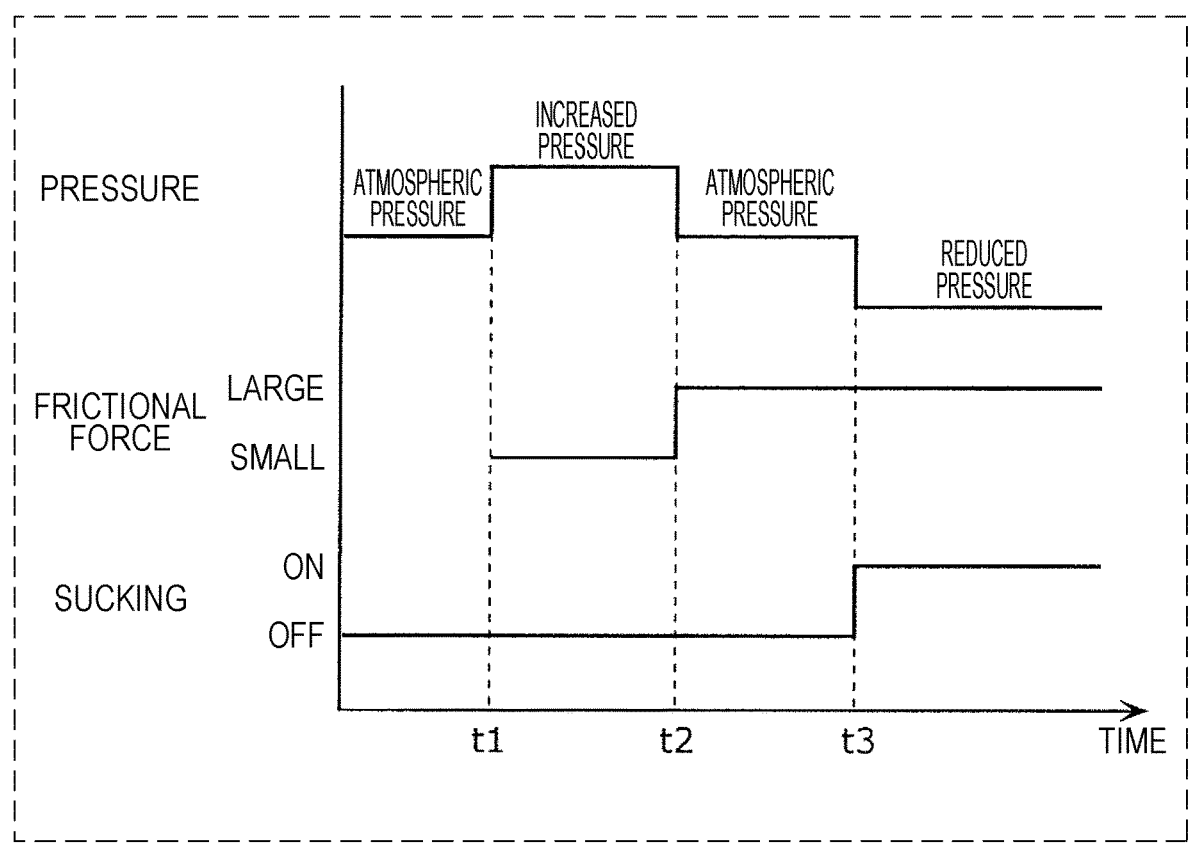
FIG. 13 is a timing chart showing the flow of the operation of the robot hand system according to the fourth embodiment.
Figure 14:
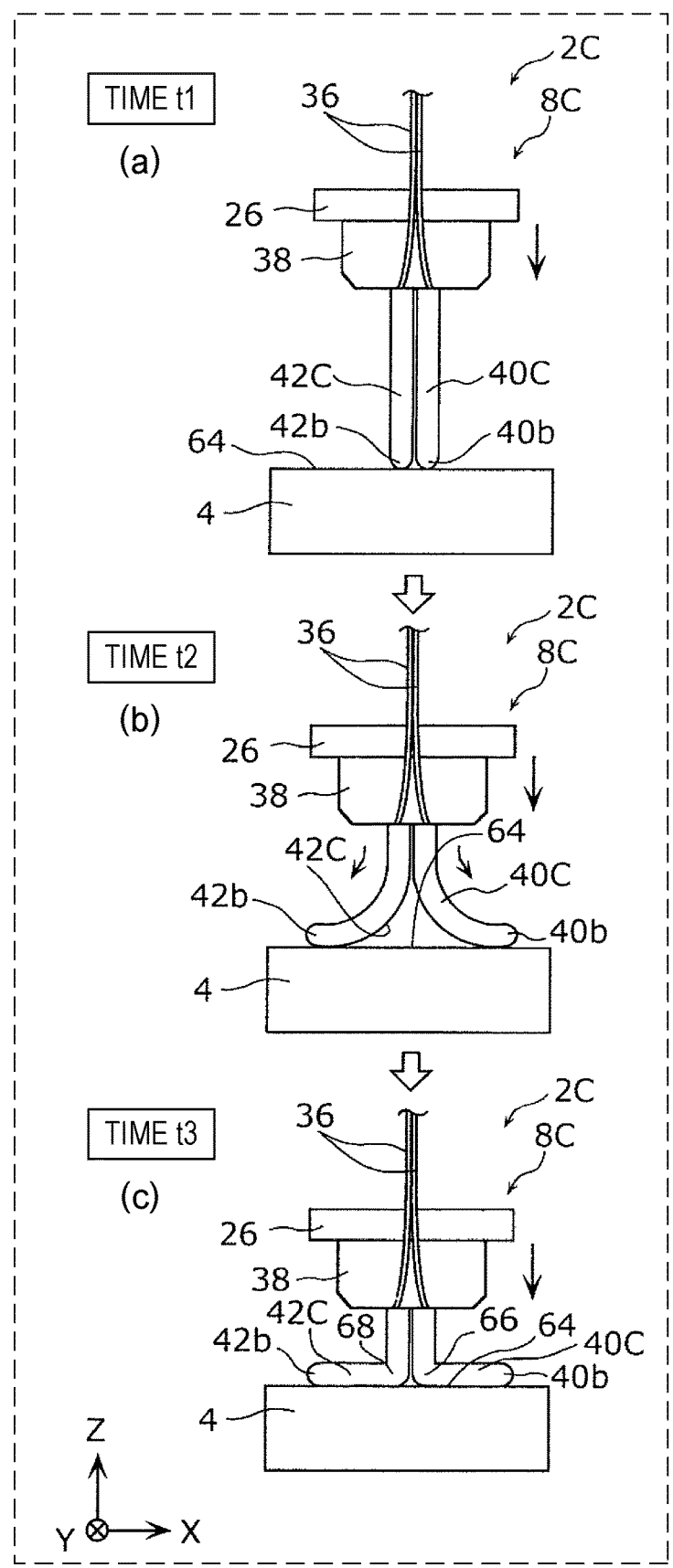
FIG. 14 illustrates the flow of the operation of the robot hand system according to the fourth embodiment.

Operation of a robot hand system 2C according to the fourth embodiment is described next with reference to FIGS. 12 to 14. FIG. 12 is a flowchart showing a flow of the operation of the robot hand system 2C according to the fourth embodiment. FIG. 13 is a timing chart showing the flow of the operation of the robot hand system 2C according to the fourth embodiment. FIG. 14 illustrates the flow of the operation of the robot hand system 2C according to the fourth embodiment. Note that, in the flowchart in FIG. 12, the same step numbers are applied to the same steps as those of the flowchart in FIG. 5 according to the first embodiment.

As illustrated in FIG. 12, steps S101 to S105 are executed similarly to the first embodiment. In step S105, as illustrated in FIG. 14(*a*), the distal end 40*b* of the first holder 40C and the distal end 42*b* of the second holder 42C touch the sucked region 64 of the object 4.

After step S105, the integrated processor 28 transmits the control signal to the pressure regulating device 16 on the basis of the image information from the tip camera 10. With the signal, the compressor is driven in the state in which the valve 34 is closed, and air from the compressor is supplied to the first space 54 of the first holder 40C and the second space 59 of the second holder 42C via the pair of tubes 36. The pressures of the first space 54 of the first holder 40C and the second space 59 of the second holder 42C are increased to be higher than the atmospheric pressure at time t1 in FIG. 13 (S201), and the frictional force between the sucked region 64 of the object 4 and each of the first holder 40C and the second holder 42C becomes relatively small.

As illustrated in FIG. 14(*b*), the robot hand apparatus 8 is further lowered, and the distal end 40*b* of the first holder 40C and the distal end 42*b* of the second holder 42C are pressed to the sucked region 64 of the object 4 (S106). At this time, since the frictional force between the sucked region 64 of the object 4 and each of the first holder 40C and the second holder 42C is relatively small, the distal end 40*b* of the first holder 40C and the distal end 42*b* of the second holder 42C move in a direction away from each other while sliding on the sucked region 64.

When the distal end 40*b* of the first holder 40C and the distal end 42*b* of the second holder 42C have reached the ends of the sucked region 64 (YES in S107), the integrated processor 28 transmits the control signal to the pressure regulating device 16 on the basis of the image information from the tip camera 10. With the signal, the valve 34 is opened at time t2 in FIG. 13, the pressures of the first space 54 of the first holder 40C and the second space 59 of the second holder 42C are restored to the atmospheric pressure (S202), and the frictional force between the sucked region 64 of the object 4 and each of the first holder 40C and the second holder 42C becomes relatively large.

In this state, when the distal end 40*b* of the first holder 40C and the distal end 42*b* of the second holder 42C are further pressed to the sucked region 64 of the object 4 (S109), the distal end 40*b* of the first holder 40C and the distal end 42*b* of the second holder 42C are fixed at positions so as not to protrude from the ends of the sucked region 64.

Then, as illustrated in FIG. 14(*c*), the first sucking surface 44C and the second sucking surface 46C are respectively bent at substantially right angle at the first position 66 and the second position 68. The integrated processor 28 transmits the control signal to the pressure regulating device 16 on the basis of the image information from the tip camera 10. With the signal, the vacuum pump 32 is driven in the state in which the valve 34 is closed, and air is sucked from the first space 54 of the first holder 40C and the second space 59 of the second holder 42C via the pair of tubes 36. The pressures of the first space 54 of the first holder 40C and the second space 59 of the second holder 42C are reduced to be lower than the atmospheric pressure at time t3 in FIG. 13, and hence the first holder 40C and the second holder 42C suck the sucked region 64 using negative pressure (S203). In this way, the object 4 is held by the first holder 40C and the second holder 42C, and is picked up from the palette 18. Then, steps S110 to S112 are executed similarly to the first embodiment.

4-3. Advantages

As described above, in this embodiment, the frictional force between the sucked region 64 of the object 4 and each of the first holder 40C and the second holder 42C can be changed. By reducing the frictional force until the distal end 40*b* of the first holder 40C and the distal end 42*b* of the second holder 42C reach the ends of the sucked region 64, the distal ends 40*b* and 42*b* can slide on the sucked region 64. Also, by increasing the frictional force when the distal end 40*b* of the first holder 40C and the distal end 42*b* of the second holder 42C have reached the ends of the sucked region 64, the distal ends 40*b* and 42*b* can be fixed onto the sucked region 64.

Further, in this embodiment, since the first sucking surface 44C and the second sucking surface 46C are closed, even when either of the first sucking surface 44C and the second sucking surface 46C has a region with poor adhesion to the object 4, high sucking force can be maintained.

Fifth Embodiment 5-1. Configuration of Robot Hand Apparatus

Figure 15:
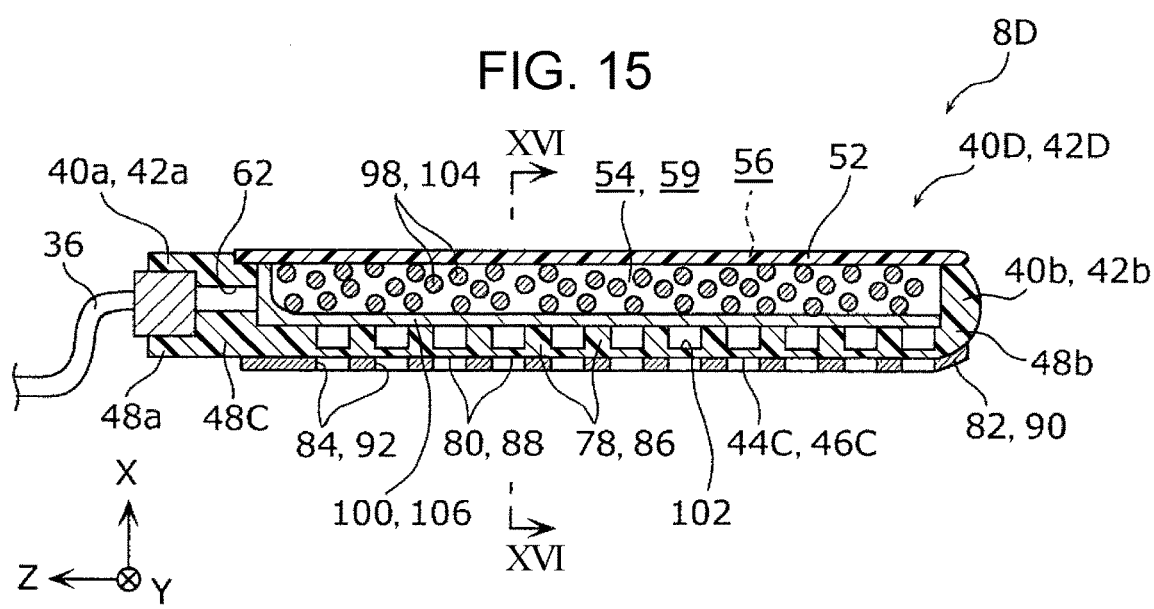
FIG. 15 is a cross-sectional view illustrating a first holder (second holder) of a robot hand apparatus according to a fifth embodiment.
Figure 16:
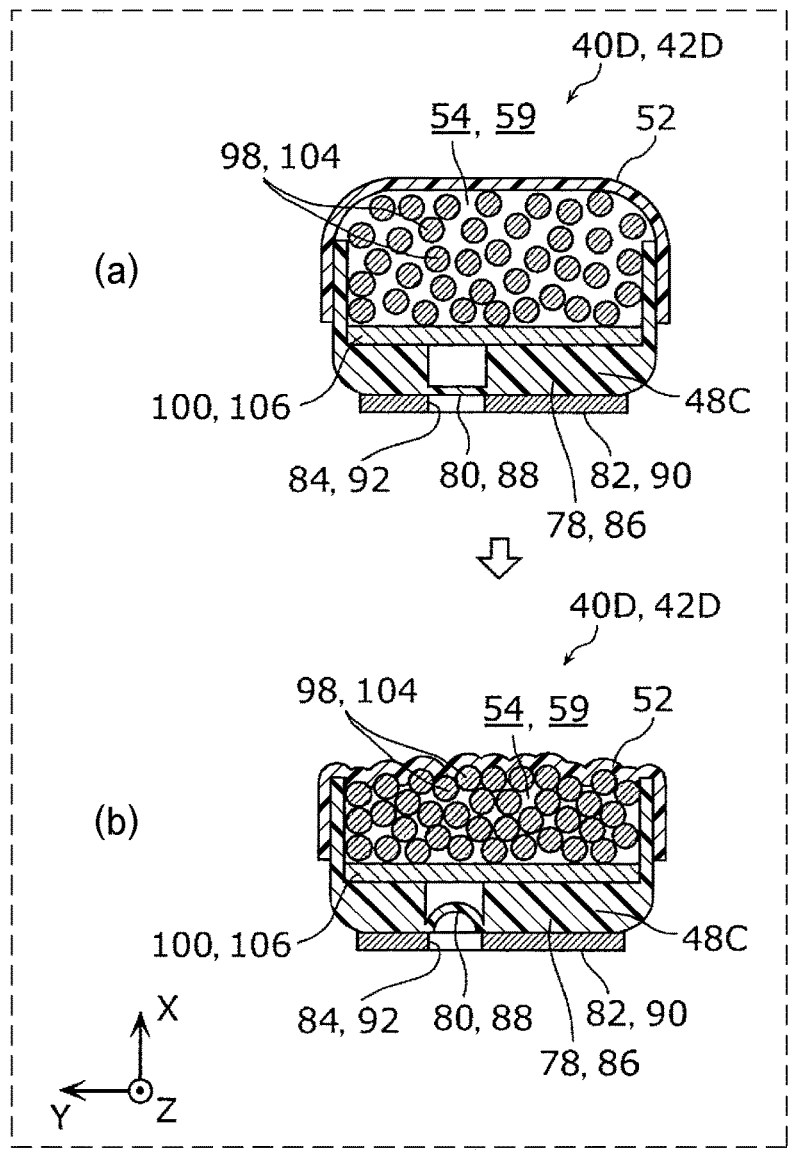
FIG. 16 illustrates cross-sectional views of the first holder (second holder) of the robot hand apparatus according to the fifth embodiment taken along line XVI-XVI of FIG. 15.

A robot hand apparatus 8D according to a fifth embodiment is described next with reference to FIGS. 15 and 16. FIG. 15 is a cross-sectional view illustrating a first holder 40D (second holder 42D) of the robot hand apparatus 8D according to the fifth embodiment. FIG. 16 illustrates cross-sectional views of the first holder 40D (second holder 42D) of the robot hand apparatus 8D according to the fifth embodiment taken along line XVI-XVI of FIG. 15.

As illustrated in FIGS. 15 and 16, in the robot hand apparatus 8D according to the fifth embodiment, the configurations of the first holder 40D and the second holder 42D differ from those of the fourth embodiment. Specifically, when the pressures of the first space 54 and the second space 59 are reduced to be lower than the atmospheric pressure, the first holder 40D and the second holder 42D are hardened.

In the first space 54 of the first holder 40D, first particles 98 and a first filter 100 are arranged instead of the above-described filling member 50.

The first particles 98 are formed of, for example, particulate substances, such as glass beads, beads foam, or calcium carbonate. Alternatively, the first particles 98 may be formed of sponge, rubber chips, or sawdust, instead of the particulate substances. The first particles 98 are filled in the first space 54.

The first filter 100 is formed of, for example, a narrow and breathable mesh. The first filter 100 is arranged to cover the connection hole 62, the first thick portions 78, and the first thin portions 80. This arrangement can prevent the first particles 98 from entering a recess 102 defined by the first thin portion 80 or the connection hole 62.

Similarly, in the second space 59 of the second holder 42D, second particles 104 and a second filter 106 are arranged instead of the above-described filling member 50.

The second particles 104 are formed similarly to the first particles 98. The second particles 104 are filled in the second space 59.

The second filter 106, which is formed similarly to the first filter 100, is arranged to cover the connection hole 62, the second thick portions 86, and the second thin portions 88.

The principle that the first holder 40D and the second holder 42D are hardened is described next. As illustrated in FIG. 16(a), when the first space 54 of the first holder 40D is in the state a) in which the pressure is increased to be higher than the atmospheric pressure or the state b) in which the pressure is set to the atmospheric pressure by the pressure regulating device 16 (see FIG. 1), the first space 54 has a space in which the first particles 98 move, and hence the first particles can freely move in the first space 54. Thus, the first holder 40D can be deformed in any shape.

In contrast, as illustrated in FIG. 16(b), when the first space 54 of the first holder 40D is in the state c) in which the pressure is reduced to be lower than the atmospheric pressure by the pressure regulating device 16, a sealing member 52 (an example of first deformable wall) contracts. Thus, the volume of the first space 54 is reduced, and the volume ratio of the first particles 98 to the first space 54 is increased. This reduces the space in which the first particles 98 move in the first space 54, the degree of adhesion between the first particles 98 is increased, and the frictional force generated between the first particles 98 is increased. Hence, restriction on the movement of the first particles 98 in the first space 54, or what is called jamming transition phenomenon occurs. Thus, the first holder 40D is hardened, and the shape of the first holder 40D is fixed in the shape at the time at which the pressure of the first space 54 is reduced to be lower than the atmospheric pressure (for example, the shape that is bent at substantially right angle).

The principle that the second holder 42D is hardened is similar to the above-described principle. That is, as illustrated in FIG. 16(a), when the second space 59 of the second holder 42D is in the state a) in which the pressure is increased to be higher than the atmospheric pressure or the state b) in which the pressure is set to the atmospheric pressure by the pressure regulating device 16, the second holder 42D can be deformed in any shape.

In contrast, as illustrated in FIG. 16(b), when the second space 59 of the second holder 42D is in the state c) in which the pressure is reduced to be lower than the atmospheric pressure by the pressure regulating device 16, a sealing member 52 (an example of second deformable wall) contracts. Thus, the second holder 42D is hardened, and the shape of the second holder 42D is fixed in the shape at the time at which the pressure of the second space 59 is reduced to be lower than the atmospheric pressure (for example, the shape that is bent at substantially right angle).

5-2. Advantages

In this embodiment, when the object 4 (see FIG. 14(c)) is sucked to the first holder 40D and the second holder 42D, the shape of each of the first holder 40D and the second holder 42D can be fixed. Consequently, the object 4 can be stably held.

Sixth Embodiment 6-1. Configuration of Robot Hand Apparatus

Figure 17:
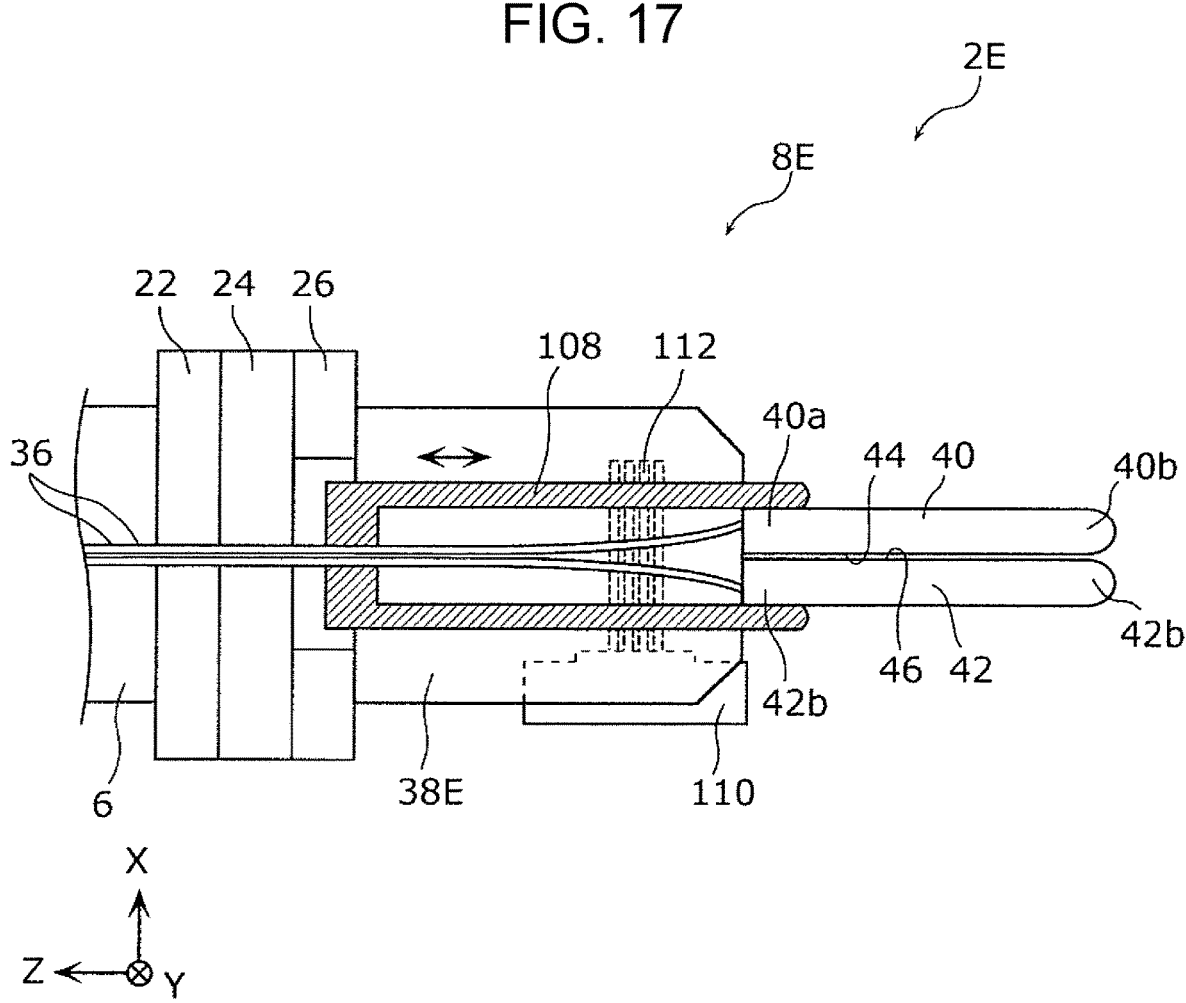
FIG. 17 is a cross-sectional view illustrating a primary section of a robot hand apparatus according to a sixth embodiment.

A robot hand apparatus 8E according to a sixth embodiment is described next with reference to FIG. 17. FIG. 17 is a cross-sectional view illustrating a primary section of the robot hand apparatus 8E according to the sixth embodiment.

As illustrated in FIG. 17, the robot hand apparatus 8E according to the sixth embodiment differs from the first embodiment in that a guide member 108 and a driver 110 are provided.

The robot hand apparatus 8E includes a hand supporter 38E having rails (not illustrated) arranged to extend in the longitudinal directions (Z-axis direction) of the first holder 40 and the second holder 42.

The guide member 108 is a member that adjusts the first position 66 and the second position 68 that are the positions at which the first sucking surface 44 and the second sucking surface 46 are respectively bent. The guide member 108 is slidably supported by the rails of the hand supporter 38E, and is arranged to cover the first holder 40D and the second holder 42 from lateral sides. Thus, the guide member 108 can slide in the longitudinal directions of the first holder 40 and the second holder 42 while covering the first holder 40 and the second holder 42 from the lateral sides. The guide member 108 also has a rack (not illustrated).

The driver 110 is a driving source that slides the guide member 108, and is formed of, for example, a thin stepping motor. The driver 110 is arranged on the hand supporter 38E, and has a pinion 112 that is meshed with the rack of the guide member 108. When the driver 110 drives the pinion 112, the guide member 108 slides along the rails of the hand supporter 38E. In this embodiment, the driver 110 is formed of the thin stepping motor and rack and pinion mechanics; however, it is not limited thereto. For example, the driver 110 may be formed of a mechanism using a direct-acting motor, a pneumatic cylinder, or a hydraulic cylinder.

The integrated processor 28 (see FIG. 1) of the controller 14 transmits the control signal to the driver 110. The driver 110 is driven on the basis of the control signal from the integrated processor 28.

6-2. Operation of Robot Hand System

Figure 18:
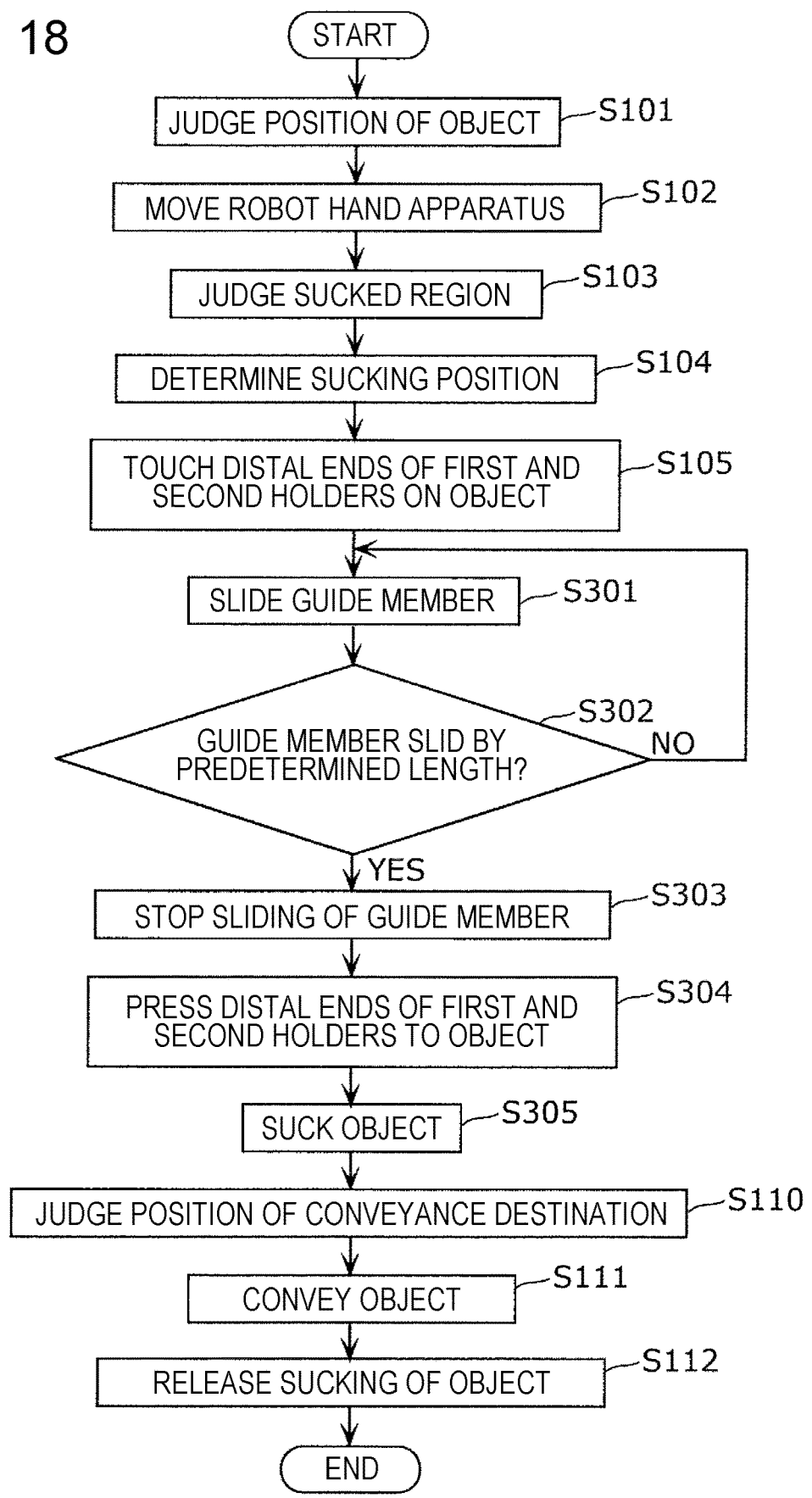
FIG. 18 is a flowchart showing a flow of operation of a robot hand system according to the sixth embodiment.
Figure 19:
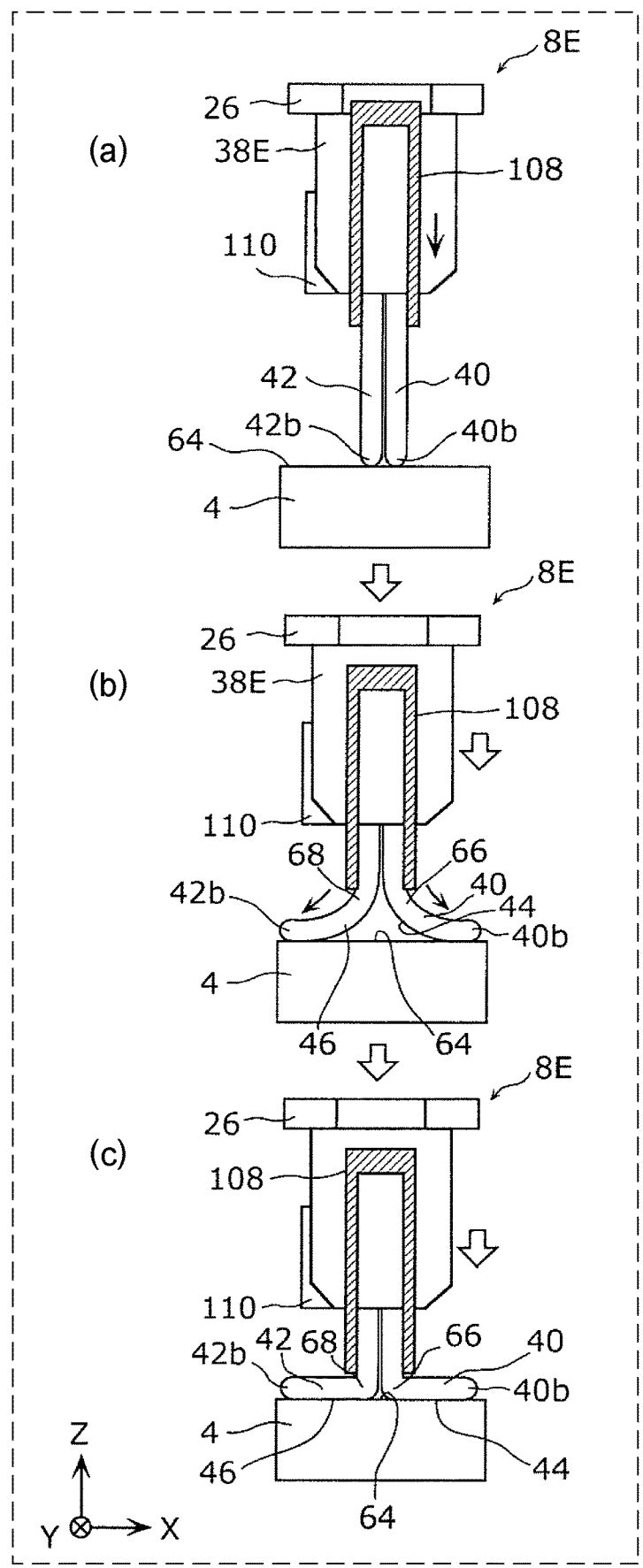
FIG. 19 illustrates the flow of the operation of the robot hand system according to the sixth embodiment.

Operation of a robot hand system 2E according to the sixth embodiment is described next with reference to FIGS. 18 and 19. FIG. 18 is a flowchart showing a flow of the operation of the robot hand system 2E according to the sixth embodiment. FIG. 19 illustrates the flow of the operation of the robot hand system 2E according to the sixth embodiment. Note that, in the flowchart in FIG. 18, the same step numbers are applied to the same steps as those of the flowchart in FIG. 5 according to the first embodiment.

As illustrated in FIG. 18, steps S101 to S105 are executed similarly to the first embodiment. In step S105, as illustrated in FIG. 19(a), the distal end 40b of the first holder 40 and the distal end 42b of the second holder 42 touch the sucked region 64 of the object 4. At this timing, the lowering of the robot hand apparatus 8E is temporarily stopped.

After step S105, the integrated processor 28 transmits the control signal to the driver 110 of the robot hand apparatus 8E on the basis of the image information from the tip camera 10 (see FIG. 1). As illustrated in FIG. 19(b), the driver 110 slides the guide member 108 toward the distal end 40b of the first holder 40 and the distal end 42b of the second holder 42 on the basis of the control signal from the integrated processor 28 (S301). The integrated processor 28 determines the first position 66 and the second position 68 at which the first sucking surface 44 and the second sucking surface 46 are to be respectively bent on the basis of the size of the sucked region 64 of the object 4 judged in step S103, and determines the length by which the guide member 108 slides at a predetermined length so that distal ends of the guide member 108 slide to the positions corresponding to the first position 66 and the second position 68.

Until the guide member 108 slides by the predetermined length (NO in S302), the driver 110 continuously slides the guide member 108 (S301). When the guide member 108 has slid by the predetermined length (YES in S302), the driver 110 stops the sliding of the guide member 108 (S303). At this time, the distal ends of the guide member 108 are arranged at the positions corresponding to the first position 66 and the second position 68 at which the first sucking surface 44 and the second sucking surface 46 are to be respectively bent.

As illustrated in FIG. 19(b), the robot hand apparatus 8E is further lowered, and the distal end 40b of the first holder 40 and the distal end 42b of the second holder 42 are pressed to the sucked region 64 of the object 4 (S304). At this time, the guide member 108 inhibits the area between the proximal end 40a of the first holder 40 and the position corresponding to the first position 66, and the area between the proximal end 42a of the second holder 42 and the position corresponding to the second position 68 from being bent. Thus, as illustrated in FIG. 19(c), the first sucking surface 44 and the second sucking surface 46 are respectively bent at substantially right angle at the first position 66 and the second position 68 along the distal ends of the guide member 108. At this time, the distal end 40b of the first holder 40 and the distal end 42b of the second holder 42 are arranged at positions so as not to protrude from the ends of the sucked region 64.

Then, the integrated processor 28 transmits the control signal to the pressure regulating device 16 on the basis of the image information from the tip camera 10. With the signal, the vacuum pump 32 is driven in the state in which the valve 34 is closed, and air is sucked from the first space 54 of the first holder 40 and the second space 59 of the second holder 42 via the pair of tubes 36. Thus, the first holder 40 and the second holder 42 suck the sucked region 64 using negative pressure (S305). Then, steps S110 to S112 are executed similarly to the first embodiment.

6-3. Advantages

As described above, in this embodiment, the first position 66 and the second position 68 at which the first sucking surface 44 and the second sucking surface 46 are respectively bent can be easily adjusted in accordance with the size of the sucked region 64 of the object 4 as described above.

Seventh Embodiment

Figure 20:
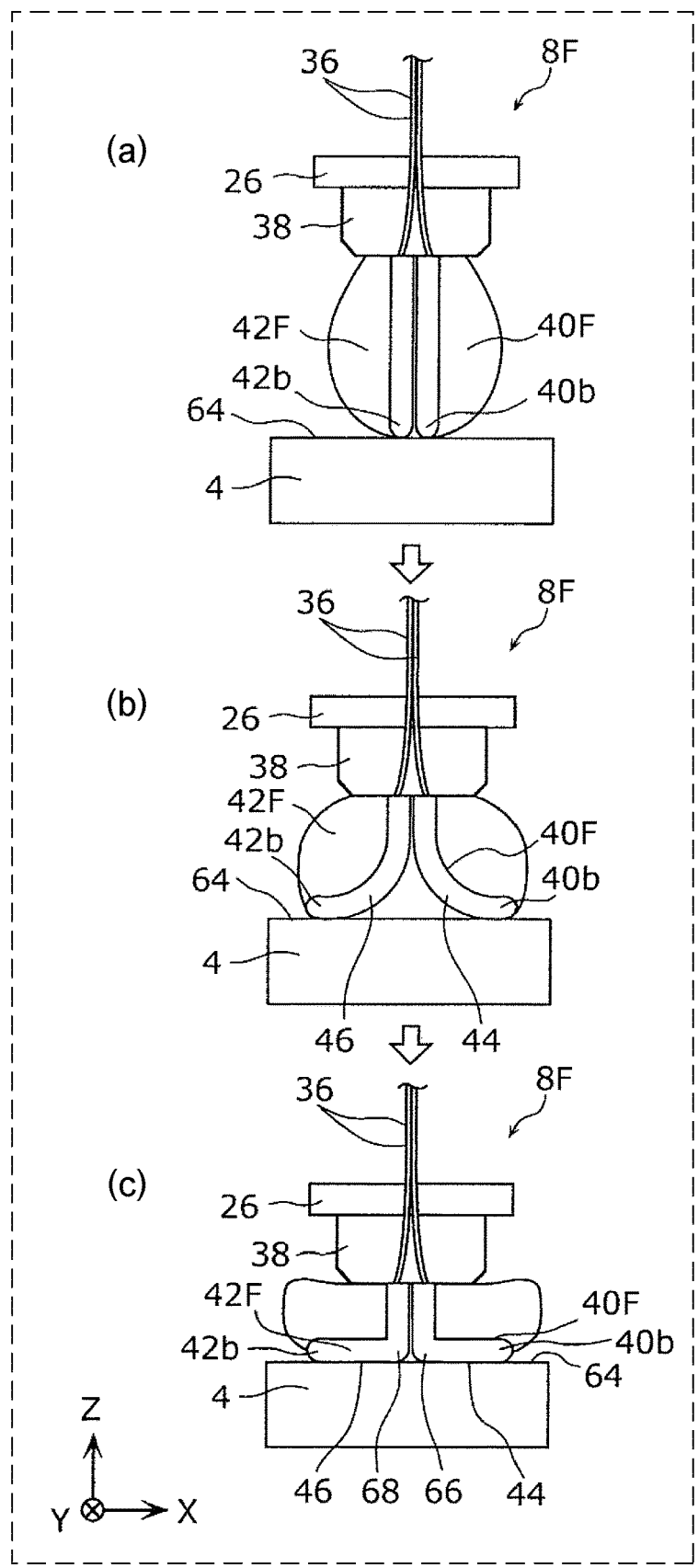
FIG. 20 illustrates a robot hand apparatus according to a seventh embodiment.

A robot hand apparatus 8F according to a seventh embodiment is described next with reference to FIG. 20. FIG. 20 illustrates the robot hand apparatus 8F according to the seventh embodiment.

As illustrated in FIG. 20(a), in the robot hand apparatus 8F according to the seventh embodiment, the configurations of a first holder 40F and a second holder 42F differ from those of the first embodiment. Specifically, a surface of the first holder 40F on the side opposite to the first sucking surface 44 protrudes outward in a substantially semi-cylindrical shape. Similarly, a surface of the second holder 42F on the side opposite to the second sucking surface 46 protrudes outward in a substantially semi-cylindrical shape.

With this configuration, when the distal end 40b of the first holder 40F and the distal end 42b of the second holder 42F are pressed to the sucked region 64 of the object 4, as illustrated in FIG. 20(b) and FIG. 20(c), the first sucking surface 44 and the second sucking surface 46 are respectively bent at the first position 66 and the second position 68. Thus, advantages similar to those of the first embodiment can be obtained in this embodiment.

Other Modifications

While the robot hand apparatus according to one or multiple aspects has been described above with reference to the first to seventh embodiments, the present disclosure is not limited to the first to seventh embodiments. Embodiments modified in various ways conceivable by those skilled in the art and an embodiment constructed by combining components in different embodiments may be included within the scope of one or multiple aspects as long as the embodiments are not departing from the spirit of the present disclosure.

While the robot hand apparatus includes the two holders in any of the above-described embodiments, it is not limited thereto, and the robot hand apparatus may include one, or three or more holders.

While the distal ends of the first holder and the second holder expand to the ends of the sucked region of the object when the object is sucked to the first holder and the second holder in any of the above-described embodiments, it is not limited thereto. For example, a table in which the weight and shape of the object 4 are associated in advance with the size when the distal ends of the first holder and the second holder expand may be stored in a memory of the controller. Thus, the integrated processor can cause the distal ends of the first holder and the second holder to expand up to the size corresponding to the weight and shape of the object 4 with reference to the table. Consequently, the distal ends of the first holder and the second holder do not necessarily have to expand to the ends of the sucked region of the object.

In any of the above-described embodiments, each component may be formed of dedicated hardware or may be provided by executing a software program suitable for each component. Each component may be provided by a program executing unit, such as a central processing unit (CPU) or a processor, reading a software program stored in a storage medium, such as a hard disk or a semiconductor memory.

The components constituting each of the above-described apparatuses or devices may be partly or entirely formed of an integrated circuit (IC) card or a single module that is removably attached to the apparatus or device. The IC card or the module is a computer system formed of a microprocessor, a read-only memory (ROM), a random-access memory (RAM), or the like. The IC card or the module may include a super multi-functional large scale integrated (LSI) circuit. The microprocessor operates in accordance with the computer program and thus the IC card or the module provides the function. The IC card or the module may be tamper resistant.

The present disclosure may be a method as one described above. The method may be provided by a computer program executed by a computer, or may be a digital signal composed of the computer program. The present disclosure may be a computer-readable storage medium storing the computer program or the digital signal. The storage medium is, for example, a flexible disk, a hard disk, a CD-ROM, a magneto-optical (MO) disk, a digital versatile disk (DVD), a DVD-ROM, a DVD-RAM, Blu-ray (BD) Disc (registered trademark), or a semiconductor memory. The present disclosure may be the digital signal stored in such a storage medium. According to the present disclosure, the computer program or the digital signal may be transmitted via an electric communication line, a wireless or wired communication line, a network typically represented by the Internet, or data broadcasting. The present disclosure may be a computer system including a microprocessor and a memory, the memory may store the computer program, and the microprocessor may be operated in accordance with the computer program. The present disclosure may be implemented by another independent computer system by storing the program or the digital signal in the storage medium and transferring the storage medium, or by transferring the program or the digital signal via the network or the like.

The robot hand apparatus according to the present disclosure is useful for a robot hand system that picks up, for example, a product in a warehouse of a store.

What is claimed is:

1. A robot hand apparatus, comprising:
a supporter;
a first holder with a proximal end thereof supported by the supporter, the first holder having a first sucking surface that is bendable at any position and that sucks an object using negative pressure; and
a second holder with a proximal end thereof supported by the supporter, the second holder having a second sucking surface that is bendable at any position and that sucks the object using negative pressure,
wherein the first holder and the second holder are arranged such that the first sucking surface opposes the second sucking surface, and
wherein, when the first holder and the second holder hold the object, in a state in which the first sucking surface is bent at a first position and the second sucking surface is bent at a second position, the object is sucked to a region of the first sucking surface between the first position and a distal end of the first holder, and the object is sucked to a region of the second sucking surface between the second position and a distal end of the second holder.

2. The robot hand apparatus according to claim 1,
wherein the first holder and the second holder are formed of an elastic material, and
wherein the distal ends of the first holder and the second holder are pressed to the object, and thus the first sucking surface and the second sucking surface are respectively bent at the first position and the second position.

3. The robot hand apparatus according to claim 2,
wherein the first holder extends long from the proximal end to the distal end of the first holder,
wherein the second holder extends long from the proximal end to the distal end of the second holder,
wherein a size of the first holder in a direction perpendicular to a longitudinal direction of the first holder gradually decreases from the proximal end toward the distal end of the first holder, and
wherein a size of the second holder in a direction perpendicular to a longitudinal direction of the second holder gradually decreases from the proximal end toward the distal end of the second holder.

4. The robot hand apparatus according to claim 2, further comprising:
a first sucker that is provided at the distal end of the first holder and that sucks the object using negative pressure independently from the first sucking surface; and
a second sucker that is provided at the distal end of the second holder and that sucks the object using negative pressure independently from the second sucking surface.

5. The robot hand apparatus according to claim 1,
wherein the first sucking surface has a first sucking hole through which air is sucked,
wherein the second sucking surface has a second sucking hole through which air is sucked, and
wherein, when the first holder and the second holder hold the object, the first sucking surface and the second sucking surface suck air respectively through the first sucking hole and the second sucking hole, and thus suck the object using negative pressure.

6. The robot hand apparatus according to claim 5,
wherein the first sucking hole includes multiple first sucking holes, and the second sucking hole includes multiple second sucking holes, and
wherein, when the first holder and the second holder hold the object, a region of the first sucking surface between the first position and the proximal end of the first holder comes into contact with a region of the second sucking surface between the second position and the proximal end of the second holder.

7. The robot hand apparatus according to claim 1,
wherein a first space is formed in the first holder,
wherein a second space is formed in the second holder,
wherein the first sucking surface has a first thick portion and a first thin portion that is thinner than the first thick portion,
wherein the second sucking surface has a second thick portion and a second thin portion that is thinner than the second thick portion, and
wherein, when the first holder and the second holder hold the object, pressures of the first space and the second space are reduced to be lower than an atmospheric pressure, and thus the first thin portion and the second thin portion are deformed to respectively protrude toward the first space and the second space and suck the object using negative pressure.

8. The robot hand apparatus according to claim 7, further comprising:
a first grip member arranged to cover the first sucking surface, formed of a material having frictional force larger than frictional force of the first thin portion, and having a first opening through which the first thin portion is exposed to outside; and
a second grip member arranged to cover the second sucking surface, formed of a material having frictional force larger than frictional force of the second thin portion, and having a second opening through which the second thin portion is exposed to outside,
wherein, when the pressures of the first space and the second space are increased to be higher than the atmospheric pressure, the first thin portion is deformed to protrude toward a side opposite to the first space and thus touches the object through the first opening, and the second thin portion is deformed to protrude toward a side opposite to the second space and thus touches the object through the second opening, and
wherein, when the pressures of the first space and the second space are set to the atmospheric pressure, a location of the first thin portion is nearer to the first space than a location of the first opening and thus the first grip member touches the object, and a location of the second thin portion is nearer to the second space than a location of the second opening and thus the second grip member touches the object.

9. The robot hand apparatus according to claim 7,
wherein the first space of the first holder is filled with first particles,
wherein the second space of the second holder is filled with second particles,
wherein a first deformable wall is formed on a side surface of the first holder, covers the first space from a lateral side, and can contract when the pressure of the first space is reduced to be lower than the atmospheric pressure, and wherein a second deformable wall is formed on a side surface of the second holder, covers the second space from a lateral side, and can contract when the pressure of the second space is reduced to be lower than the atmospheric pressure.

10. The robot hand apparatus according to claim 1,
wherein the first holder extends long from the proximal end to the distal end of the first holder,
wherein the second holder extends long from the proximal end to the distal end of the second holder, and
wherein the robot hand apparatus further comprises:
a guide member that is slidably supported by the supporter, that is arranged to cover the first holder and the second holder from lateral sides, and that adjusts the first position and the second position at which the first sucking surface and the second sucking surface are respectively bent; and
a driver that slides the guide member in longitudinal directions of the first holder and the second holder.

11. The robot hand apparatus according to claim 1,
wherein the first holder has a first jet hole through which gas is jetted toward the object, and
wherein the second holder has a second jet hole through which gas is jetted toward the object.

12. A robot hand system, comprising:
the robot hand apparatus according to claim 1;
a robot arm apparatus that supports the robot hand apparatus and that changes a position or a posture of the robot hand apparatus;
a pressure regulating device that sucks air from the first holder and the second holder of the robot hand apparatus; and
a controller that controls the robot arm apparatus and the pressure regulating device so that the robot hand apparatus holds the object.

13. The robot hand system according to claim 12, further comprising:
an imaging device that image captures the object,
wherein the controller judges a sucked region that can be sucked of a sucked surface of the object on the basis of a result of the image capture by the imaging device, and thus the distal ends of the first holder and the second holder are pressed to the object so as not to protrude from the sucked region.

14. A holding method using a robot hand apparatus,
the robot hand apparatus including
a supporter,
a first holder with a proximal end thereof supported by the supporter, the first holder having a first sucking surface that is bendable at any position and that sucks an object using negative pressure, and
a second holder with a proximal end thereof supported by the supporter, the second holder having a second sucking surface that is bendable at any position and that sucks the object using negative pressure,
the first holder and the second holder being arranged such that the first sucking surface opposes the second sucking surface,
the method comprising:

touching distal ends of the first holder and the second holder on the object;
pressing the distal ends of the first holder and the second holder to the object, and thus bending the first sucking surface and the second sucking surface respectively at a first position and a second position; and
causing the object to be sucked to a region of the first sucking surface between the first position and the distal end of the first holder, and causing the object to be sucked to a region of the second sucking surface between the second position and the distal end of the second holder.

15. The holding method according to claim 14, further comprising:
image capturing the object using an imaging device;
judging a sucked region that is included in a sucked surface of the object and that can be sucked to the first sucking surface of the first holder and the second sucking surface of the second holder; and
determining the first position and the second position on the basis of a size of the sucked region.

16. A robot hand apparatus, comprising:
a supporter that supports a first proximal end and a second proximal end;
a first holder that has a first distal end, the first proximal end, and a first surface; and
a second holder that has a second distal end, the second proximal end, and a second surface,
wherein when the apparatus does not hold an object, the first surface opposes the second surface,
wherein when the apparatus holds a first object, a third surface and a fourth surface touch the first object, a fifth surface and a sixth surface does not touch the first object, and the fifth surface opposes the sixth surface, the first surface including the third surface and the fifth surface, the second surface including the fourth surface and the sixth surface,
wherein when the apparatus holds a second object, a seventh surface and an eighth surface touch the second object, a ninth surface and a tenth surface does not touch the second object, and the ninth surface opposes the tenth surface, the first surface including the seventh surface and the ninth surface, the second surface including the eighth surface and the tenth surface,
wherein a location of the fifth surface is nearer to the first proximal end than a location of the third surface and a location of the sixth surface is nearer to the second proximal end than a location of the fourth surface,
wherein a location of the ninth surface is nearer to the first proximal end than a location of the seventh surface and a location of the tenth surface is nearer to the second proximal end than a location of the eighth surface,
wherein a first border between the fifth surface and the third surface is nearer to the first distal end than a second border between the ninth surface and the seventh surface, and
wherein a third border between the sixth surface and the fourth surface is nearer to the second distal end than a fourth border between the tenth surface and the eighth surface.

* * * * *